US012804451B2

(12) United States Patent
Forenza et al.

(10) Patent No.: US 12,804,451 B2
(45) **Date of Patent: *Nov. 17, 2026**

(54) SYSTEMS AND METHODS FOR EXPLOITING INTER-CELL MULTIPLEXING GAIN IN WIRELESS CELLULAR SYSTEMS VIA DISTRIBUTED INPUT DISTRIBUTED OUTPUT TECHNOLOGY

(71) Applicant: Rearden, LLC, Mountain View, CA (US)

(72) Inventors: Antonio Forenza, San Francisco, CA (US); Stephen G. Perlman, Palo Alto, CA (US)

(73) Assignee: Rearden, LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/440,224

(22) Filed: Jan. 5, 2026

(65) Prior Publication Data

US 2026/0129505 A1 May 7, 2026

Related U.S. Application Data

(63) Continuation of application No. 18/389,127, filed on Nov. 13, 2023, now Pat. No. 12,581,351, which is a continuation of application No. 16/208,895, filed on Dec. 4, 2018, now Pat. No. 11,818,604, which is a (Continued)

(51) Int. Cl.

| | |
|---|---|
| ***H04W 28/02*** | (2009.01) |
| ***H04B 7/024*** | (2017.01) |
| *H04B 7/0417* | (2017.01) |
| *H04B 7/0452* | (2017.01) |
| *H04B 7/06* | (2006.01) |
| *H04J 11/00* | (2006.01) |

(52) U.S. Cl.

CPC ........ *H04W 28/0236* (2013.01); *H04B 7/024* (2013.01); *H04B 7/0417* (2013.01); *H04B 7/0452* (2013.01); *H04B 7/063* (2013.01); *H04B 7/0632* (2013.01); *H04B 7/0639* (2013.01); *H04J 11/0053* (2013.01)

(58) Field of Classification Search

CPC .... H04B 7/024; H04B 7/0417; H04B 7/0452; H04B 7/063; H04B 7/0632; H04B 7/0639; H04W 28/0236; H04J 11/0053

See application file for complete search history.

(56) References Cited

U.S. PATENT DOCUMENTS

| | | | | |
|---|---|---|---|---|
| 5,619,503 A * | 4/1997 | Dent | .................. | H04B 7/18513 370/335 |
| 8,918,135 B2 * | 12/2014 | Park | .................... | H04W 52/146 455/524 |
| 10,771,273 B2 * | 9/2020 | Luo | ....................... | H04L 5/0073 |

(Continued)

*Primary Examiner* — Congvan Tran

(74) *Attorney, Agent, or Firm* — Amster, Rothstein & Ebenstein LLP

(57) ABSTRACT

Systems and methods are described for exploiting inter-cell interference to achieve multiplexing gain in a multiple antenna system (MAS) with multi-user (MU) transmissions ("MU-MAS"). For example, a MU-MAS of one embodiment comprises a wireless cellular network with multiple distributed antennas operating cooperatively to eliminate inter-cell interference and increase network capacity exploiting inter-cell multiplexing gain.

12 Claims, 10 Drawing Sheets

Related U.S. Application Data continuation of application No. 14/086,700, filed on Nov. 21, 2013, now Pat. No. 10,194,346.

(60) Provisional application No. 61/729,990, filed on Nov. 26, 2012.

(56) References Cited

U.S. PATENT DOCUMENTS

| | | | | |
|---|---|---|---|---|
| 2012/0281783 | A1* | 11/2012 | Cheng | H04B 7/0456<br>375/295 |
| 2013/0044722 | A1* | 2/2013 | Kang | H04L 1/1854<br>370/329 |
| 2013/0114656 | A1* | 5/2013 | Sayana | H04B 7/024<br>375/260 |
| 2014/0177467 | A1* | 6/2014 | Kim | H04W 52/226<br>370/252 |
| 2015/0163719 | A1* | 6/2015 | Lim | H04W 36/0058<br>455/438 |

* cited by examiner

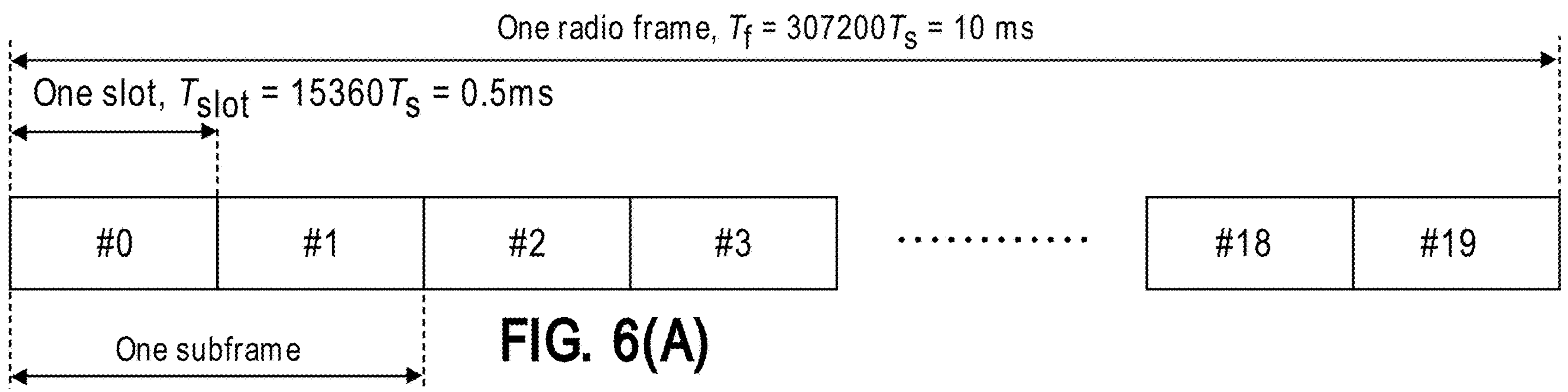
FIG. 6(A)
| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |
FIG. 6(C)
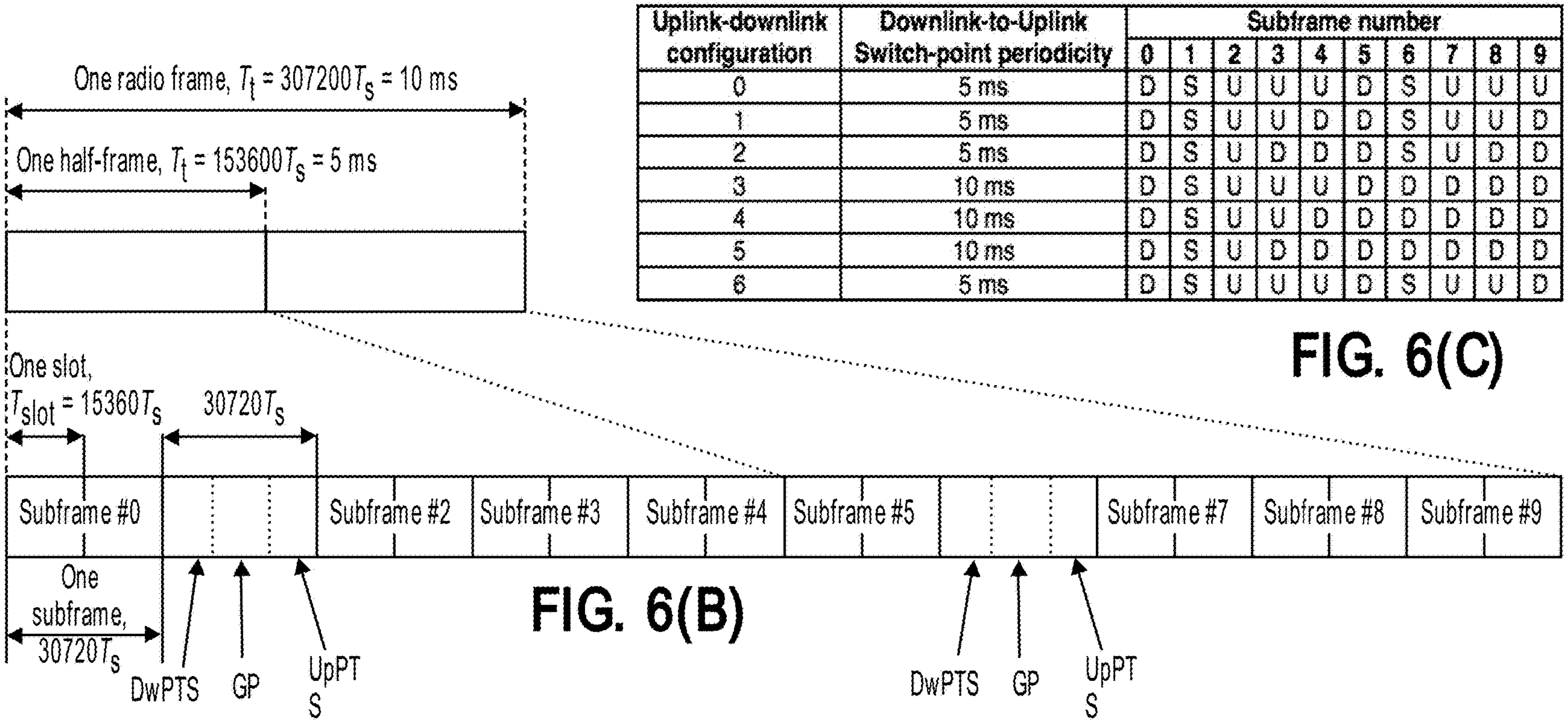
FIG. 6(B)

SYSTEMS AND METHODS FOR EXPLOITING INTER-CELL MULTIPLEXING GAIN IN WIRELESS CELLULAR SYSTEMS VIA DISTRIBUTED INPUT DISTRIBUTED OUTPUT TECHNOLOGY

CLAIM TO PRIORITY

This application is a continuation of co-pending U.S. patent application Ser. No. 18/389,127, filed Nov. 13, 2023, which is a continuation of U.S. patent application Ser. No. 16/208,895, filed Dec. 4, 2018, now U.S. Issued U.S. Pat. No. 11,818,604, Issued on Nov. 14, 2023, which is a continuation of U.S. patent application Ser. No. 14/086,700, filed Nov. 21, 2013, now U.S. Issued U.S. Pat. No. 10,194,346, Issued on Jan. 29, 2019, which application claims the benefit of co-pending U.S. Provisional Application No. 61/729,990, entitled, "Systems And Methods For Exploiting Inter-Cell Multiplexing Gain In Wireless Cellular Systems Via Distributed Input Distributed Output Technology", filed Nov. 26, 2012, which is assigned to the assignee of the present application. This application is herein incorporated by reference in its entirety.

RELATED APPLICATIONS

This application may be related to the following issued U.S. Patents and co-pending U.S. Patent Applications:

- U.S. Pat. No. 12,470,941, issued Oct. 29, 2025, entitled "System And Method For Concurrent Spectrum Usage within Actively Used Spectrum";
- U.S. Pat. No. 12,355,520, issued Jul. 8, 2025, entitled "System and Methods for Radio Frequency Calibration Exploiting Channel Reciprocity in Distributed Input Distributed Output Wireless Communications"
- U.S. Pat. No. 12,355,519, issued Jul. 8, 2025, entitled "System and Methods for Radio Frequency Calibration Exploiting Channel Reciprocity in Distributed Input Distributed Output Wireless Communications"
- U.S. Pat. No. 12,341,582, issued Jun. 24, 2025, entitled "System And Method For Mitigating Interference within Actively Used Spectrum"
- U.S. Pat. No. 12,244,369, issued Mar. 4, 2025, entitled "System and Methods for Radio Frequency Calibration Exploiting Channel Reciprocity in Distributed Input Distributed Output Wireless Communications"
- U.S. Pat. No. 12,237,888, issued Feb. 25, 2025, entitled "System and Methods for Radio Frequency Calibration Exploiting Channel Reciprocity in Distributed Input Distributed Output Wireless Communications"
- U.S. Pat. No. 12,224,819, issued Feb. 11, 2025, entitled "System and Methods for Radio Frequency Calibration Exploiting Channel Reciprocity in Distributed Input Distributed Output Wireless Communications"
- U.S. Pat. No. 12,170,401, issued Dec. 17, 2024, entitled "System And Method For Distributing Radioheads"
- U.S. Pat. No. 12,166,546, issued Dec. 10, 2024, entitled "System and Methods for Radio Frequency Calibration Exploiting Channel Reciprocity in Distributed Input Distributed Output Wireless Communications"
- U.S. Pat. No. 12,166,280, issued Dec. 10, 2024, entitled "System And Method For Distributing Radioheads"
- U.S. Pat. No. 11,923,931, issued Mar. 5, 2024, entitled "System and Method For Distributed Antenna Wireless Communications"
- U.S. Pat. No. 11,901,992, issued Feb. 13, 2024, entitled "Systems And Methods For Exploiting Inter-Cell Multiplexing Gain In Wireless Cellular Systems Via Distributed Input Distributed Output Technology"

- U.S. Pat. No. 11,818,604, issued Nov. 14, 2023, entitled "Systems And Methods For Exploiting Inter-Cell Multiplexing Gain In Wireless Cellular Systems Via Distributed Input Distributed Output Technology"
- U.S. Pat. No. 11,646,773, issued May 9, 2023, entitled "System and Method For Distributed Antenna Wireless Communications"
- U.S. Pat. No. 11,581,924, issued Feb. 14, 2023, entitled "System and Methods for Radio Frequency Calibration Exploiting Channel Reciprocity in Distributed Input Distributed Output Wireless Communications"
- U.S. Pat. No. 11,451,281, issued Sep. 20, 2022, entitled "Systems And Methods For Exploiting Inter-Cell Multiplexing Gain In Wireless Cellular Systems Via Distributed Input Distributed Output Technology"
- U.S. Pat. No. 11,451,275, issued Sep. 20, 2022, entitled "System and Method For Distributed Antenna Wireless Communications"
- U.S. Pat. No. 11,394,436, issued Jul. 19, 2022, entitled "System and Method For Distributed Antenna Wireless Communications"
- U.S. Pat. No. 11,309,943, issued Apr. 19, 2022, entitled "System and Methods for Planned Evolution and Obsolescence of Multiuser Spectrum"
- U.S. Pat. No. 11,290,162, issued Mar. 29, 2022, entitled "System And Method For Mitigating Interference within Actively Used Spectrum"
- U.S. Pat. No. 11,196,467, issued Dec. 7, 2021, entitled "System and Method For Distributed Antenna Wireless Communications"
- U.S. Pat. No. 11,190,947, issued Nov. 30, 2021, entitled "System And Method For Concurrent Spectrum Usage within Actively Used Spectrum"
- U.S. Pat. No. 11,190,247, issued Nov. 30, 2021, entitled "System and Method For Distributed Antenna Wireless Communications"
- U.S. Pat. No. 11,190,246, issued Nov. 30, 2021, entitled "System and Method For Distributed Antenna Wireless Communications"
- U.S. Pat. No. 11,189,917, filed Nov. 30, 2021, entitled "System And Method For Distributing Radioheads"
- U.S. Pat. No. 11,146,313, issued Oct. 12, 2021, entitled "System and Methods for Radio Frequency Calibration Exploiting Channel Reciprocity in Distributed Input Distributed Output Wireless Communications"
- U.S. Pat. No. 11,070,258, issued Jul. 20, 2021, entitled "System and Methods for Planned Evolution and Obsolescence of Multiuser Spectrum"
- U.S. Pat. No. 11,050,468, issued Jun. 29, 2021, entitled "System And Method For Mitigating Interference within Actively Used Spectrum"
- U.S. Pat. No. 10,985,811, issued Apr. 20, 2021, entitled "System and Method For Distributed Antenna Wireless Communications"
- U.S. Pat. No. 10,886,979, issued Jan. 4, 2021, entitled "System And Method For Link adaptation In DIDO Multicarrier Systems"
- U.S. Pat. No. 10,848,225, issued Nov. 24, 2020, entitled "Systems And Methods For Exploiting Inter-Cell Multiplexing Gain In Wireless Cellular Systems Via Distributed Input Distributed Output Technology"
- U.S. Pat. No. 10,749,582, issued Aug. 18, 2020, entitled "Systems and Methods to Coordinate Transmissions in Distributed Wireless Systems via User Clustering"

U.S. Pat. No. 10,727,907, issued Jul. 28, 2020, entitled "System and Methods to Enhance Spatial Diversity in Distributed-Input Distributed-Output Wireless Systems"

U.S. Pat. No. 10,547,358, issued Jan. 28, 2020, entitled "System and Methods for Radio Frequency Calibration Exploiting Channel Reciprocity in Distributed Input Distributed Output Wireless Communications"

U.S. Pat. No. 10,425,134, issued Sep. 24, 2019, entitled "System and Methods for Planned Evolution and Obsolescence of Multiuser Spectrum"

U.S. Pat. No. 10,349,417, issued Jul. 9, 2019, entitled "System and Methods to Compensate for Doppler Effects in Distributed-Input Distributed Output Systems"

U.S. Pat. No. 10,333,604, issued, Jun. 25, 2019, entitled "System and Method For Distributed Antenna Wireless Communications"

U.S. Pat. No. 10,320,455, issued Jun. 11, 2019, entitled "Systems and Methods to Coordinate Transmissions in Distributed Wireless Systems via User Clustering"

U.S. Pat. No. 10,277,290, issued Apr. 30, 2019, entitled "Systems and Methods to Exploit Areas of Coherence in Wireless Systems"

U.S. Pat. No. 10,243,623, issued Mar. 26, 2019, entitled "System and Methods to Enhance Spatial Diversity in Distributed-Input Distributed-Output Wireless Systems"

U.S. Pat. No. 10,200,094, issued Feb. 5, 2019, entitled "Interference Management, Handoff, Power Control And Link Adaptation In Distributed-Input Distributed-Output (DIDO) Communication Systems"

U.S. Pat. No. 10,194,346, issued Jan. 29, 2019, entitled "System and Methods for Exploiting Inter-Cell Multiplexing Gain in Wireless Cellular Systems Via Distributed Input Distributed Output Technology"

U.S. Pat. No. 10,187,133, issued Jan. 22, 2019, entitled "System And Method For Power Control And Antenna Grouping In A Distributed-Input-Distributed-Output (DIDO) Network"

U.S. Pat. No. 10,164,698, issued Dec. 25, 2018, entitled "System and Methods for Exploiting Inter-Cell Multiplexing Gain in Wireless Cellular Systems Via Distributed Input Distributed Output Technology"

U.S. Pat. No. 9,973,246, issued May 15, 2018, entitled "System and Methods for Exploiting Inter-Cell Multiplexing Gain in Wireless Cellular Systems Via Distributed Input Distributed Output Technology"

U.S. Pat. No. 9,923,657, issued Mar. 20, 2018, entitled "System and Methods for Exploiting Inter-Cell Multiplexing Gain in Wireless Cellular Systems Via Distributed Input Distributed Output Technology"

U.S. Pat. No. 9,826,537, issued Nov. 21, 2017, entitled "System And Method For Managing Inter-Cluster Handoff Of Clients Which Traverse Multiple DIDO Clusters"

U.S. Pat. No. 9,819,403, issued Nov. 14, 2017, entitled "System And Method For Managing Handoff Of A Client Between Different Distributed-Input-Distributed-Output (DIDO) Networks Based On Detected Velocity Of The Client"

U.S. Pat. No. 9,685,997, issued Jun. 20, 2017, entitled "Systems and Methods to Enhance Spatial Diversity in Distributed Input Distributed Output Wireless Systems."

U.S. Pat. No. 9,386,465, issued, Jul. 5, 2016, entitled "System and Method For Distributed Antenna Wireless Communications"

U.S. Pat. No. 9,369,888, issued Jun. 14, 2016, entitled "Systems and Methods to Coordinate Transmissions in Distributed Wireless Systems via User Clustering"

U.S. Pat. No. 9,312,929, issued Apr. 12, 2016, entitled "System and Methods to Compensate for Doppler Effects in Distributed-Input Distributed Output Systems."

U.S. Pat. No. 8,989,155, issued Mar. 24, 2015, entitled "System and Methods for Wireless Backhaul in Distributed-Input Distributed-Output Wireless Systems"

U.S. Pat. No. 8,971,380, issued Mar. 3, 2015, entitled "System And Method For Adjusting DIDO Interference Cancellation Based On Signal Strength Measurements"

U.S. Pat. No. 8,654,815, issued Feb. 18, 2014, entitled "System and Method For Distributed Antenna Wireless Communications"

U.S. Pat. No. 8,571,086, issued Oct. 29, 2013, entitled "System And Method For DIDO Precoding Interpolation In Multicarrier Systems"

U.S. Pat. No. 8,542,763, issued Sep. 24, 2013, entitled "Systems And Methods To Coordinate Transmissions In Distributed Wireless Systems Via User Clustering"

U.S. Pat. No. 8,428,162, issued Apr. 23, 2013, entitled "System and Method for Distributed Input Distributed Output Wireless Communication"

U.S. Pat. No. 8,170,081, issued May 1, 2012, entitled "System And Method For Adjusting DIDO Interference Cancellation Based On Signal Strength Measurements"

U.S. Pat. No. 8,160,121, issued Apr. 17, 2012, entitled, "System and Method For Distributed Input-Distributed Output Wireless Communications";

U.S. Pat. No. 7,885,354, issued Feb. 8, 2011, entitled "System and Method For Enhancing Near Vertical Incidence Skywave ("NVIS") Communication Using Space-Time Coding."

U.S. Pat. No. 7,711,030, issued May 4, 2010, entitled "System and Method For Spatial-Multiplexed Tropospheric Scatter Communications";

U.S. Pat. No. 7,636,381, issued Dec. 22, 2009, entitled "System and Method for Distributed Input Distributed Output Wireless Communication"

U.S. Pat. No. 7,633,994, issued Dec. 15, 2009, entitled "System and Method for Distributed Input Distributed Output Wireless Communication"

U.S. Pat. No. 7,599,420, issued Oct. 6, 2009, entitled "System and Method for Distributed Input Distributed Output Wireless Communication";

U.S. Pat. No. 7,418,053, issued Aug. 26, 2008, entitled "System and Method for Distributed Input Distributed Output Wireless Communication";

U.S. patent application Ser. No. 19/214,698, filed May 21, 2025, entitled "System And Method For Mitigating Interference within Actively Used Spectrum";

U.S. patent application Ser. No. 19/199,110, filed May 5, 2025, entitled "System and Methods for Radio Frequency Calibration Exploiting Channel Reciprocity in Distributed Input Distributed Output Wireless Communications";

U.S. patent application Ser. No. 18/981,039, filed Oct. 12, 2024, entitled "System And Method For Distributing Radioheads";

U.S. patent application Ser. No. 18/439,711, filed Feb. 12, 2024, entitled, "System and Methods for Exploiting Inter-Cell Multiplexing Gain in Wireless Cellular Systems Via Distributed Input Distributed Output Technology";

U.S. patent application Ser. No. 18/389,127, filed Nov. 13, 2023, entitled "System and Methods for Exploiting Inter-Cell Multiplexing Gain in Wireless Cellular Systems Via Distributed Input Distributed Output Technology";

U.S. patent application Ser. No. 16/505,593, filed Jul. 8, 2019, entitled "System and Methods to Compensate for Doppler Effects in Distributed-Input Distributed Output Systems.";

U.S. patent application Ser. No. 14/611,565, filed Feb. 2, 2015, entitled "System and Method For Mapping Virtual Radio Instances Into Physical Areas of Coherence in Distributed Antenna Wireless Systems";

BACKGROUND

In the last three decades, the wireless cellular market has experienced increasing number of subscribers worldwide as well as demand for better services shifting from voice to web-browsing and real-time HD video streaming. This increasing demand for services that requires higher data rate, lower latency and improved reliability has driven a radical evolution of wireless technologies through different standards. Beginning from the first generation analog AMPS and TACS (for voice service) in the early 1980s, to 2G and 2.5G digital GSM, IS-95 and GPRS (for voice and data services) in the 1990s, to 3G with UMTS and CDMA2000 (for web-browsing) in the early 2000s, and finally LTE (for high-speed internet connectivity) currently under deployment in different countries worldwide.

Long-term evolution (LTE) is the standard developed by the 3$^{rd}$ generation partnership project (3GPP) for fourth generation (4G) wireless cellular systems. LTE can achieve up to 4× improvement in downlink spectral efficiency over previous 3G and HSPA+ standards by exploiting the spatial components of wireless channels via multiple-input multiple-output (MIMO) technology. LTE-Advanced is the evolution of LTE, currently under standardization, that will enable up to 8× increase in spectral efficiency over 3G standard systems.

Despite this technology evolution, it is very likely that in the next three years wireless carriers will not be able to satisfy the growing demand for data rate due to raising market penetration of smartphones and tables, offering more data-hungry applications like real-time HD video streaming, video conferencing and gaming. It has been estimated that capacity of wireless networks will grow 5× in Europe from 2011 to 2015 due to improved technologies such as LTE as well as more spectrum made available by the government [25]. For example, the FCC is planning to free 500 MHz of spectrum by 2020 (of which 300 MHz will be available by 2015) to promote wireless Internet connectivity throughout the US as part of the National Broadband Plan [24]. Unfortunately, the forecast for capacity usage by 2015 is 23× over 2011 in Europe [25] and similar spectrum deficit is expected to happen in the US by 2014 [26-27]. As a result of this data crunch, revenues for wireless carriers may drop below their CAPEX and OPEX with potentially devastating impact on the wireless market [28].

As capacity gains offered by LTE deployment and increased spectrum availability are insufficient, the only foreseeable solution to prevent this upcoming spectrum crisis is to promote new wireless technologies [29]. LTE-Advanced (the evolution of LTE standard) promises additional gains over LTE through more sophisticated MIMO techniques and by increasing the density of "small cells" [30]. However, there are limits to the number of cells that can fit a certain area without incurring interference issues or increasing the complexity of the backhaul to allow coordination across cells.

BRIEF DESCRIPTION OF THE DRAWINGS

A better understanding of the present invention can be obtained from the following detailed description in conjunction with the drawings, in which:

FIGS. 6*a-c* illustrates details associated with LTE frames;

DETAILED DESCRIPTION

Figure 1:
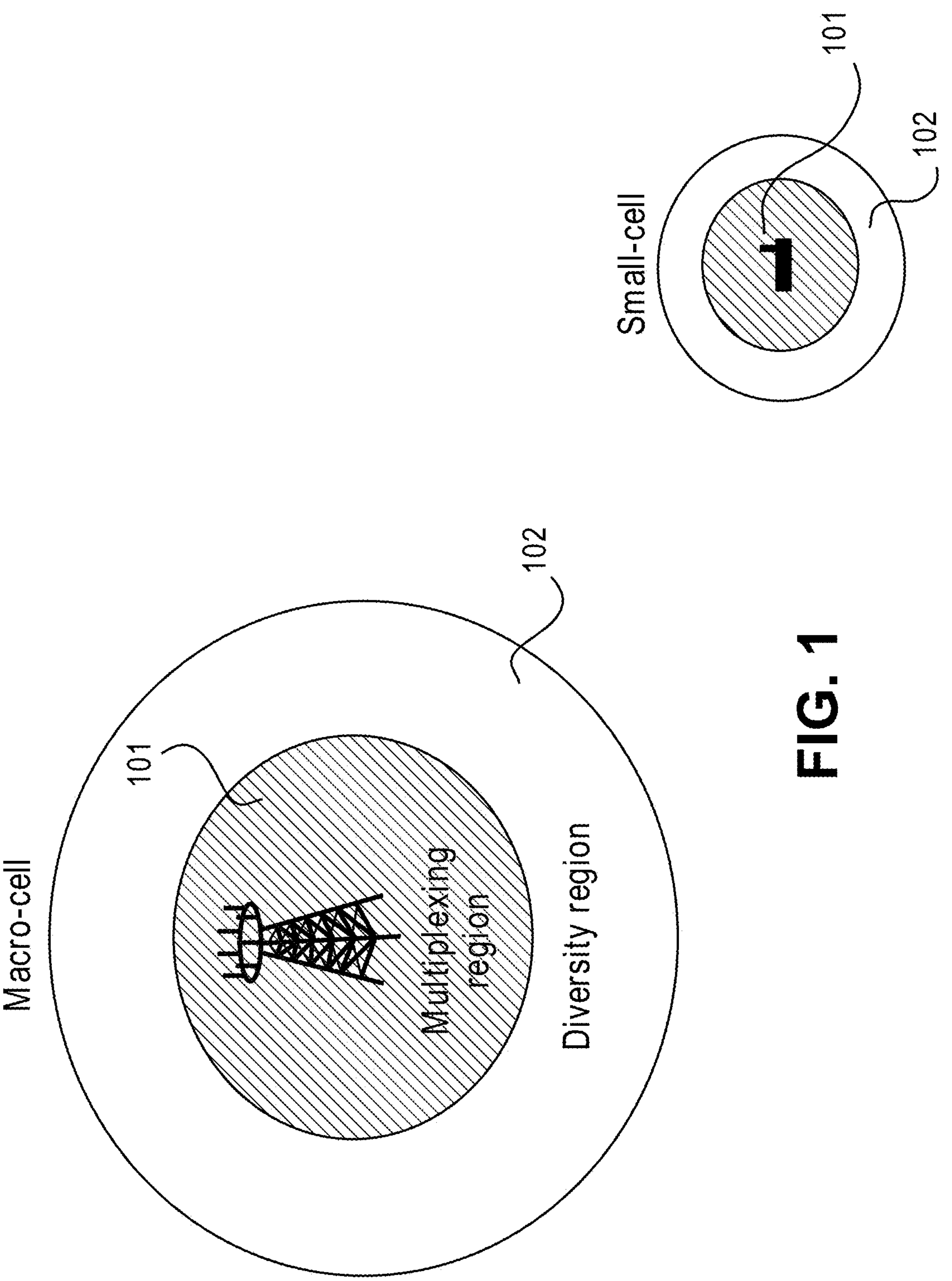
FIG. 1 illustrates cells divided into a multiplexing region and a diversity region.

One solution to overcome many of the above prior art limitations is an embodiment of Distributed-Input Distributed-Output (DIDO) technology. DIDO technology is described in the following patents and patent applications, all of which are assigned the assignee of the present patent and are incorporated by reference. These patents and applications are sometimes referred to collectively herein as the "Related Patents and Applications."

U.S. Pat. No. 12,470,941, issued Oct. 29, 2025, entitled "System And Method For Concurrent Spectrum Usage within Actively Used Spectrum";

U.S. Pat. No. 12,355,520, issued Jul. 8, 2025, entitled "System and Methods for Radio Frequency Calibration Exploiting Channel Reciprocity in Distributed Input Distributed Output Wireless Communications"

U.S. Pat. No. 12,355,519, issued Jul. 8, 2025, entitled "System and Methods for Radio Frequency Calibration Exploiting Channel Reciprocity in Distributed Input Distributed Output Wireless Communications"

U.S. Pat. No. 12,341,582, issued Jun. 24, 2025, entitled "System And Method For Mitigating Interference within Actively Used Spectrum"

U.S. Pat. No. 12,244,369, issued Mar. 4, 2025, entitled "System and Methods for Radio Frequency Calibration Exploiting Channel Reciprocity in Distributed Input Distributed Output Wireless Communications"

U.S. Pat. No. 12,237,888, issued Feb. 25, 2025, entitled "System and Methods for Radio Frequency Calibration Exploiting Channel Reciprocity in Distributed Input Distributed Output Wireless Communications"

U.S. Pat. No. 12,224,819, issued Feb. 11, 2025, entitled "System and Methods for Radio Frequency Calibration Exploiting Channel Reciprocity in Distributed Input Distributed Output Wireless Communications"

U.S. Pat. No. 12,170,401, issued Dec. 17, 2024, entitled "System And Method For Distributing Radioheads"

U.S. Pat. No. 12,166,546, issued Dec. 10, 2024, entitled "System and Methods for Radio Frequency Calibration Exploiting Channel Reciprocity in Distributed Input Distributed Output Wireless Communications"

U.S. Pat. No. 12,166,280, issued Dec. 10, 2024, entitled "System And Method For Distributing Radioheads"

U.S. Pat. No. 11,923,931, issued Mar. 5, 2024, entitled "System and Method For Distributed Antenna Wireless Communications"

U.S. Pat. No. 11,901,992, issued Feb. 13, 2024, entitled "Systems And Methods For Exploiting Inter-Cell Multiplexing Gain In Wireless Cellular Systems Via Distributed Input Distributed Output Technology"

U.S. Pat. No. 11,818,604, issued Nov. 14, 2023, entitled "Systems And Methods For Exploiting Inter-Cell Multiplexing Gain In Wireless Cellular Systems Via Distributed Input Distributed Output Technology"

U.S. Pat. No. 11,646,773, issued May 9, 2023, entitled "System and Method For Distributed Antenna Wireless Communications"

U.S. Pat. No. 11,581,924, issued Feb. 14, 2023, entitled "System and Methods for Radio Frequency Calibration Exploiting Channel Reciprocity in Distributed Input Distributed Output Wireless Communications"

U.S. Pat. No. 11,451,281, issued Sep. 20, 2022, entitled "Systems And Methods For Exploiting Inter-Cell Multiplexing Gain In Wireless Cellular Systems Via Distributed Input Distributed Output Technology"

U.S. Pat. No. 11,451,275, issued Sep. 20, 2022, entitled "System and Method For Distributed Antenna Wireless Communications"

U.S. Pat. No. 11,394,436, issued Jul. 19, 2022, entitled "System and Method For Distributed Antenna Wireless Communications"

U.S. Pat. No. 11,309,943, issued Apr. 19, 2022, entitled "System and Methods for Planned Evolution and Obsolescence of Multiuser Spectrum"

U.S. Pat. No. 11,290,162, issued Mar. 29, 2022, entitled "System And Method For Mitigating Interference within Actively Used Spectrum"

U.S. Pat. No. 11,196,467, issued Dec. 7, 2021, entitled "System and Method For Distributed Antenna Wireless Communications"

U.S. Pat. No. 11,190,947, issued Nov. 30, 2021, entitled "System And Method For Concurrent Spectrum Usage within Actively Used Spectrum"

U.S. Pat. No. 11,190,247, issued Nov. 30, 2021, entitled "System and Method For Distributed Antenna Wireless Communications"

U.S. Pat. No. 11,190,246, issued Nov. 30, 2021, entitled "System and Method For Distributed Antenna Wireless Communications"

U.S. Pat. No. 11,189,917, filed Nov. 30, 2021, entitled "System And Method For Distributing Radioheads"

U.S. Pat. No. 11,146,313, issued Oct. 12, 2021, entitled "System and Methods for Radio Frequency Calibration Exploiting Channel Reciprocity in Distributed Input Distributed Output Wireless Communications"

U.S. Pat. No. 11,070,258, issued Jul. 20, 2021, entitled "System and Methods for Planned Evolution and Obsolescence of Multiuser Spectrum"

U.S. Pat. No. 11,050,468, issued Jun. 29, 2021, entitled "System And Method For Mitigating Interference within Actively Used Spectrum"

U.S. Pat. No. 10,985,811, issued Apr. 20, 2021, entitled "System and Method For Distributed Antenna Wireless Communications"

U.S. Pat. No. 10,886,979, issued Jan. 4, 2021, entitled "System And Method For Link adaptation In DIDO Multicarrier Systems"

U.S. Pat. No. 10,848,225, issued Nov. 24, 2020, entitled "Systems And Methods For Exploiting Inter-Cell Multiplexing Gain In Wireless Cellular Systems Via Distributed Input Distributed Output Technology"

U.S. Pat. No. 10,749,582, issued Aug. 18, 2020, entitled "Systems and Methods to Coordinate Transmissions in Distributed Wireless Systems via User Clustering"

U.S. Pat. No. 10,727,907, issued Jul. 28, 2020, entitled "System and Methods to Enhance Spatial Diversity in Distributed-Input Distributed-Output Wireless Systems"

U.S. Pat. No. 10,547,358, issued Jan. 28, 2020, entitled "System and Methods for Radio Frequency Calibration Exploiting Channel Reciprocity in Distributed Input Distributed Output Wireless Communications"

U.S. Pat. No. 10,425,134, issued Sep. 24, 2019, entitled "System and Methods for Planned Evolution and Obsolescence of Multiuser Spectrum"

U.S. Pat. No. 10,349,417, issued Jul. 9, 2019, entitled "System and Methods to Compensate for Doppler Effects in Distributed-Input Distributed Output Systems"

U.S. Pat. No. 10,333,604, issued, Jun. 25, 2019, entitled "System and Method For Distributed Antenna Wireless Communications"

U.S. Pat. No. 10,320,455, issued Jun. 11, 2019, entitled "Systems and Methods to Coordinate Transmissions in Distributed Wireless Systems via User Clustering"

U.S. Pat. No. 10,277,290, issued Apr. 30, 2019, entitled "Systems and Methods to Exploit Areas of Coherence in Wireless Systems"

U.S. Pat. No. 10,243,623, issued Mar. 26, 2019, entitled "System and Methods to Enhance Spatial Diversity in Distributed-Input Distributed-Output Wireless Systems"

U.S. Pat. No. 10,200,094, issued Feb. 5, 2019, entitled "Interference Management, Handoff, Power Control And Link Adaptation In Distributed-Input Distributed-Output (DIDO) Communication Systems"

U.S. Pat. No. 10,194,346, issued Jan. 29, 2019, entitled "System and Methods for Exploiting Inter-Cell Multiplexing Gain in Wireless Cellular Systems Via Distributed Input Distributed Output Technology"

U.S. Pat. No. 10,187,133, issued Jan. 22, 2019, entitled "System And Method For Power Control And Antenna Grouping In A Distributed-Input-Distributed-Output (DIDO) Network"

U.S. Pat. No. 10,164,698, issued Dec. 25, 2018, entitled "System and Methods for Exploiting Inter-Cell Multiplexing Gain in Wireless Cellular Systems Via Distributed Input Distributed Output Technology"

U.S. Pat. No. 9,973,246, issued May 15, 2018, entitled "System and Methods for Exploiting Inter-Cell Multiplexing Gain in Wireless Cellular Systems Via Distributed Input Distributed Output Technology"

U.S. Pat. No. 9,923,657, issued Mar. 20, 2018, entitled "System and Methods for Exploiting Inter-Cell Multiplexing Gain in Wireless Cellular Systems Via Distributed Input Distributed Output Technology"

U.S. Pat. No. 9,826,537, issued Nov. 21, 2017, entitled "System And Method For Managing Inter-Cluster Handoff Of Clients Which Traverse Multiple DIDO Clusters"

U.S. Pat. No. 9,819,403, issued Nov. 14, 2017, entitled "System And Method For Managing Handoff Of A Client Between Different Distributed-Input-Distributed-Output (DIDO) Networks Based On Detected Velocity Of The Client"

U.S. Pat. No. 9,685,997, issued Jun. 20, 2017, entitled "Systems and Methods to Enhance Spatial Diversity in Distributed Input Distributed Output Wireless Systems."

U.S. Pat. No. 9,386,465, issued, Jul. 5, 2016, entitled "System and Method For Distributed Antenna Wireless Communications"

U.S. Pat. No. 9,369,888, issued Jun. 14, 2016, entitled "Systems and Methods to Coordinate Transmissions in Distributed Wireless Systems via User Clustering"

U.S. Pat. No. 9,312,929, issued Apr. 12, 2016, entitled "System and Methods to Compensate for Doppler Effects in Distributed-Input Distributed Output Systems."

U.S. Pat. No. 8,989,155, issued Mar. 24, 2015, entitled "System and Methods for Wireless Backhaul in Distributed-Input Distributed-Output Wireless Systems"

U.S. Pat. No. 8,971,380, issued Mar. 3, 2015, entitled "System And Method For Adjusting DIDO Interference Cancellation Based On Signal Strength Measurements"

U.S. Pat. No. 8,654,815, issued Feb. 18, 2014, entitled "System and Method For Distributed Antenna Wireless Communications"

U.S. Pat. No. 8,571,086, issued Oct. 29, 2013, entitled "System And Method For DIDO Precoding Interpolation In Multicarrier Systems"

U.S. Pat. No. 8,542,763, issued Sep. 24, 2013, entitled "Systems And Methods To Coordinate Transmissions In Distributed Wireless Systems Via User Clustering"

U.S. Pat. No. 8,428,162, issued Apr. 23, 2013, entitled "System and Method for Distributed Input Distributed Output Wireless Communication"

U.S. Pat. No. 8,170,081, issued May 1, 2012, entitled "System And Method For Adjusting DIDO Interference Cancellation Based On Signal Strength Measurements"

U.S. Pat. No. 8,160,121, issued Apr. 17, 2012, entitled, "System and Method For Distributed Input-Distributed Output Wireless Communications";

U.S. Pat. No. 7,885,354, issued Feb. 8, 2011, entitled "System and Method For Enhancing Near Vertical Incidence Skywave ("NVIS") Communication Using Space-Time Coding."

U.S. Pat. No. 7,711,030, issued May 4, 2010, entitled "System and Method For Spatial-Multiplexed Tropospheric Scatter Communications";

U.S. Pat. No. 7,636,381, issued Dec. 22, 2009, entitled "System and Method for Distributed Input Distributed Output Wireless Communication"

U.S. Pat. No. 7,633,994, issued Dec. 15, 2009, entitled "System and Method for Distributed Input Distributed Output Wireless Communication"

U.S. Pat. No. 7,599,420, issued Oct. 6, 2009, entitled "System and Method for Distributed Input Distributed Output Wireless Communication";

U.S. Pat. No. 7,418,053, issued Aug. 26, 2008, entitled "System and Method for Distributed Input Distributed Output Wireless Communication";

U.S. patent application Ser. No. 19/214,698, filed May 21, 2025, entitled "System And Method For Mitigating Interference within Actively Used Spectrum";

U.S. patent application Ser. No. 19/199,110, filed May 5, 2025, entitled "System and Methods for Radio Frequency Calibration Exploiting Channel Reciprocity in Distributed Input Distributed Output Wireless Communications";

U.S. patent application Ser. No. 18/981,039, filed Oct. 12, 2024, entitled "System And Method For Distributing Radioheads";

U.S. patent application Ser. No. 18/439,711, filed Feb. 12, 2024, entitled, "System and Methods for Exploiting Inter-Cell Multiplexing Gain in Wireless Cellular Systems Via Distributed Input Distributed Output Technology";

U.S. patent application Ser. No. 18/389,127, filed Nov. 13, 2023, entitled "System and Methods for Exploiting Inter-Cell Multiplexing Gain in Wireless Cellular Systems Via Distributed Input Distributed Output Technology";

U.S. patent application Ser. No. 16/505,593, filed Jul. 8, 2019, entitled "System and Methods to Compensate for Doppler Effects in Distributed-Input Distributed Output Systems.";

U.S. patent application Ser. No. 14/611,565, filed Feb. 2, 2015, entitled "System and Method For Mapping Virtual Radio Instances Into Physical Areas of Coherence in Distributed Antenna Wireless Systems";

To reduce the size and complexity of the present patent application, the disclosure of some of the Related Patents and Applications is not explicitly set forth below. Please see the Related Patents and Applications for a full description of the disclosure.

One promising technology that will provide orders of magnitude increase in spectral efficiency over wireless links without the limitations of conventional cellular systems is distributed-input distributed-output (DIDO) technology (see Related Patents and Applications referenced above. The present invention describes DIDO technology employed in the context of cellular systems (such as LTE or LTE-Advanced), both within and without the constraints of cellular standards, to provide significant performance benefits over conventional wireless systems. We begin with an overview on MIMO and review different spatial processing techniques employed by LTE and LTE-Advanced. Then we show how the present invention provides significant capacity gains for next generation wireless communications systems compared to prior art approaches.

MIMO employs multiple antennas at the transmitter and receiver sides of the wireless link and uses spatial processing to improve link reliability via diversity techniques (i.e., diversity gain) or provide higher data rate via multiplexing schemes (i.e., multiplexing gain) [1-2]. Diversity gain is a measure of enhanced robustness to signal fading, resulting in higher signal-to-noise ratio (SNR) for fixed data rate. Multiplexing gain is obtained by exploiting additional spatial degrees of freedom of the wireless channel to increase data rate for fixed probability of error. Fundamental tradeoffs between diversity and multiplexing in MIMO systems were described in [3-4].

In practical MIMO systems, link adaptation techniques can be used to switch dynamically between diversity and multiplexing schemes based on propagation conditions [20-

23]. For example, link adaptation schemes described in [22-23] showed that beamforming or Orthogonal Space-Time Block Codes (OSTBC) are preferred schemes in low SNR regime or channels characterized by low spatial selectivity. By contrast, spatial multiplexing can provide significant gain in data rate for channels with high SNR and high spatial selectivity. For example, FIG. 1 shows that cells can be divided in two regions: i) a multiplexing region 101, characterized by high SNR (due to proximity to the cell tower or base station) where the spatial degrees of freedom of the channel can be exploited via spatial multiplexing to increase data rate; ii) a diversity region or cell-edge 102, where spatial multiplexing techniques are not as effective and diversity methods can be used to improve SNR and coverage (yielding only marginal increase in data rate). Note that the macrocell circle in FIG. 1 labels the shaded center of the circle as the "multiplexing region" 101 and the unshaded outer region of the circle as the "diversity region" 102. This same region designation is used throughout FIGS. 1-4, where the shaded region is the "multiplexing region" and the unshaded region is the "diversity region", even if they are not labeled.

The LTE (Release 8) and LTE-Advanced (Release 10) standards define a set of ten transmission modes (TM) including either diversity or multiplexing schemes [35,85-86]:

- Mode 1: Single antenna port, port 0
- Mode 2: Transmit diversity
- Mode 3: Large-delay cyclic delay diversity (CDD), extension of open-loop spatial multiplexing for single-user MIMO (SU-MIMO)
- Mode 4: Closed-loop spatial multiplexing for SU-MIMO
- Mode 5: Multi-user MIMO (MU-MIMO)
- Mode 6: Closed-loop spatial multiplexing, using a single transmission layer
- Mode 7: Single antenna port, UE-specific RS (port 5)
- Mode 8: Single or dual-layer transmission with UE-specific RS (ports 7 and/or 8)
- Mode 9: Single or up to eight layers closed-loop SU-MIMO (added in Release 10)
- Mode 10: Multi-layer closed-loop SU-MIMO, up to eight layers (added in Release 10)

Hereafter we describe diversity and multiplexing schemes commonly used in cellular systems as well as specific methods employed in LTE as outlined above, and compare them against techniques that are unique for DIDO communications. We first identify two types of transmission methods: i) intra-cell methods (exploiting micro-diversity in cellular systems), using multiple antennas to improve link reliability or data rate within one cell; ii) inter-cell methods (exploiting macro-diversity), allowing cooperation between cells to provide additional diversity or multiplexing gains. Then we describe how the present invention provides significant advantages (including spectral capacity gain) over prior art.

1. Intra-Cell Diversity Methods

Intra-cell diversity methods operate within one cell and are designed to increase SNR in scenarios with poor link quality (e.g., users at the cell-edge subject to high pathloss from the central tower or base station). Typical diversity schemes employed in MIMO communications are beamforming [5-11] and orthogonal space-time block codes (OSTBC) [12-15].

Diversity techniques supported by the LTE standard are transmit diversity, closed-loop rank-1 precoding and dedicated beamforming [31-35]. Transmit diversity scheme supports two or four transmit antennas over the downlink (DL) and only two antennas for the uplink (UL). In the DL channel, it is implemented via space-frequency block codes (SFBC) combined with frequency-switched transmit diversity (FSTD) to exploit space as well as frequency selectivity [31]. Rank-1 precoding creates a dedicated beam to one user based on quantized weights selected from a codebook (pre-designed using limited feedback techniques [36-42]) to reduce the feedback overhead from the user equipment (UE) to the base transceiver station (BTS, or eNodeB using LTE terminology). Alternatively, dedicated beamforming weights can be computed based on UE-specific reference signal.

2. Intra-Cell Multiplexing Methods

MIMO multiplexing schemes [1,19] provide gain in data rate in high SNR regime and in scenarios with enough spatial degrees of freedom in the channel (e.g., rich multipath environments with high spatial selectivity [16-18]) to support multiple parallel data streams over wireless links.

The LTE standard supports different multiplexing techniques for single-user MIMO (SU-MIMO) and multi-user MIMO (MU-MIMO) [31]. SU-MIMO schemes have two modes of operation: i) closed-loop, exploiting feedback information from the UE to select the DL precoding weights; ii) open-loop, used when feedback from the UE is unavailable or the UE is moving too fast to support closed-loop schemes. Closed-loop schemes use a set of pre-computed weights selected from a codebook. These weights can support two or four transmit antennas as well as one to four parallel data streams (identified by number of layers of the precoding matrix), depending on the UE request and decision of the scheduler at the BTS. LTE-Advanced will include new transmission modes up to MIMO 8×8 to provide up to 8× increase in spectral efficiency via spatial processing [62].

MU-MIMO schemes are defined for both UL and DL channels [31,50]. In the UL, every UE sends a reference signal to the BTS (consisting of cyclically shifted version of the Zadoff-Chu sequence [33]). Those reference signals are orthogonal, such that the BTS can estimate the channel from all UEs and demodulate data streams from multiple UEs simultaneously via spatial processing. In the DL, precoding weights for different UEs are selected from codebooks based on the feedback from the UEs and the scheduler (similarly to closed-loop SU-MIMO schemes) and only rank-1 precoding is allowed for every UE (e.g., each UE receives only one data stream).

Intra-cell multiplexing techniques employing spatial processing provide satisfactory performance only in propagation scenarios characterized by high SNR (or SINR) and high spatial selectivity (multipath-rich environments). For conventional macrocells, these conditions may be harder to achieve as BTSs are typically far from the UEs and the distribution of the SINR is typically centered at low values [43]. In these scenarios, MU-MIMO schemes or diversity techniques may be better choices than SU-MIMO with spatial multiplexing.

Other techniques and network solutions contemplated by LTE-Advanced to achieve additional multiplexing gain (without requiring spatial processing through MIMO) are: carrier aggregation (CA) and small cells. CA [30,44-47] combines different portions of the RF spectrum to increase signal bandwidth up to 100 MHz [85], thereby yielding higher data rates. Intra-band CA combines different bands within the same portion of the spectrum. As such it can use the same RF chain for multiple channels, and multiple data streams are recombined in software. Inter-band CA requires different RF chains to operate at different portions of the spectrum as well as signal processing to recombine multiple data streams from different bands.

The key idea of small cells [30,47] is to reduce the size of conventional macro-cells, thereby allowing higher cell density and larger throughput per area of coverage. Small-cells are typically deployed through inexpensive access points with low power transmission (as depicted in FIG. 1) as opposed to tall and expensive cell towers used for macro-cells. Two types of small cells are defined in LTE-Advanced: i) metrocells, for outdoor installation in urban areas, supporting up 32 to 64 simultaneous users; and ii) femtocells, for indoor use, can serve at most 4 active users. One advantage of small cells is that the density of UEs close to the BTS is statistically higher, yielding better SNR that can be exploited via spatial multiplexing to increase data rate. There are, however, still many concerns about practical deployment of small cells, particularly related to the backhaul. In fact, it may be challenging to reach BTSs of every small cell via high-speed wireline connections, especially considering the high density of metrocells and femtocells in a given coverage area. While using Line-Of-Sight (LOS) backhaul to small cells can often be implemented inexpensively, compared to wireline backhaul, there often are no practical LOS backhaul paths available for preferred small cell BTS placements, and there is no general solution for Non-Line-Of-Sight (NLOS) wireless backhaul to small cell BTSs. Finally, small cells require complex real-time coordination across BTSs to avoid interference as in self-organized networks (SON) [30,51-52] and sophisticated cell-planning tools (even more complex than conventional cellular systems, due to higher density of small cells) to plan their optimal location [48,49].

It can be trivially shown there is no practical general solution that enables small cells to co-exist with macrocells and achieve optimal, or necessarily even improved, throughput. Among the myriad of such unsolvable situations is when small cell is located such that its UEs unavoidably overlap with a macrocell transmission and the small cell and the macrocell use the same frequencies to reach their respective UEs. Clearly in this situation, the macrocell transmission will interfere with the small cell transmission. While there may be some approach that mitigates such interference for particular circumstances of a particular macrocell, a particular small cell, the particular macrocell and small cell UEs involved, the throughput requirements of those UEs, and environmental circumstances, etc., any such approach would be highly specific, not only to the static plan of the macrocell and small cell, but to the dynamic circumstances of a particular time interval. Typically, the full throughput of the channel to each UE cannot be achieved.

3. Inter-Cell Diversity Methods

Inter-cell transmission techniques enable cooperation across BTSs to improve performance of wireless networks. These techniques are a special case of methods taught in Related Patents and Applications to enable cooperation across wireless transceivers in the general case of distributed antenna networks for multiple UEs all using the same frequency simultaneously. Cooperation across BTSs to remove inter-cell interference for the particular case of cellular systems for a single UE at a given time at a given frequency was described in [53]. The system in [53] divides every macrocell into multiple subcells and enables soft-handoff across subcells by employing dedicated beamforming from coordinated BTSs to improve link robustness at a single UE at a single frequency, as it moves along the subcell boundaries.

More recently, this class of cooperative wireless cellular networks has been defined in the MIMO literature as "network MIMO" or "coordinated multi-point" (COMP) systems. Theoretical analysis and simulated results on the benefits obtained in network MIMO by eliminating inter-cell interference are presented in [54-61]. The key advantage of network MIMO and CoMP is to remove inter-cell interference in the overlapping regions 201-203 of the cells shown in FIG. 2.

CoMP networks are actively becoming part of LTE-Advanced standard as a solution to mitigate inter-cell interference in next generation cellular networks [62-64]. Two CoMP solutions have been proposed so far in the standard to remove inter-cell interference: i) coordinated scheduling/beamforming (CS/CB), where the UE receives its data stream from only one BTS via beamfoming and coordination across BTSs is enabled to remove interference via beamforming or scheduling techniques; ii) joint processing (JP), where data for given UE is jointly transmitted from multiple BTSs to improve received signal quality and eliminate inter-cell interference. CoMP-JP yields larger gains than CoMP-CS/CB at the expenses of higher overhead in the backhaul to enable coordination across BTSs.

4. Inter-Cell Multiplexing Methods

Prior art multi-user wireless systems add complexity and introduce limitations to wireless networks which result in a situation where a given user's experience (e.g. available throughput, latency, predictability, reliability) is impacted by the utilization of the spectrum by other users in the area. Given the increasing demands for aggregate throughput within wireless spectrum shared by multiple users, and the increasing growth of applications that can rely upon multi-user wireless network reliability, predictability and low latency for a given user, it is apparent that prior art multi-user wireless technology suffers from many limitations. Indeed, with the limited availability of spectrum suitable for particular types of wireless communications (e.g. at wavelengths that are efficient in penetrating building walls), prior art wireless techniques will be insufficient to meet the increasing demands for bandwidth that is reliable, predictable and low-latency.

Prior art intra-cell diversity and multiplexing methods can only provide up to a theoretical 4× increase in throughput over current cellular networks for LTE (through MIMO 4×4) or at most a theoretical 8× for LTE-Advanced (through MIMO 8×8), although higher orders of MIMO achieve diminishing improvements in increasing throughput in a given multipath environment, particularly as UEs (such as smartphones) get smaller and more constrained in terms of antenna placement. Other marginal throughput gains in next generation cellular systems may be obtained from additional spectrum allocation (e.g., FCC national broadband plan), exploited via carrier aggregation techniques, and more dense distribution of BTSs via small cell networks and SON [30,46]. All the above techniques, however, still rely heavily on spectrum or time sharing techniques to enable multi-user transmissions, since the spectral efficiency gains obtained by spatial processing is limited.

Figure 2:
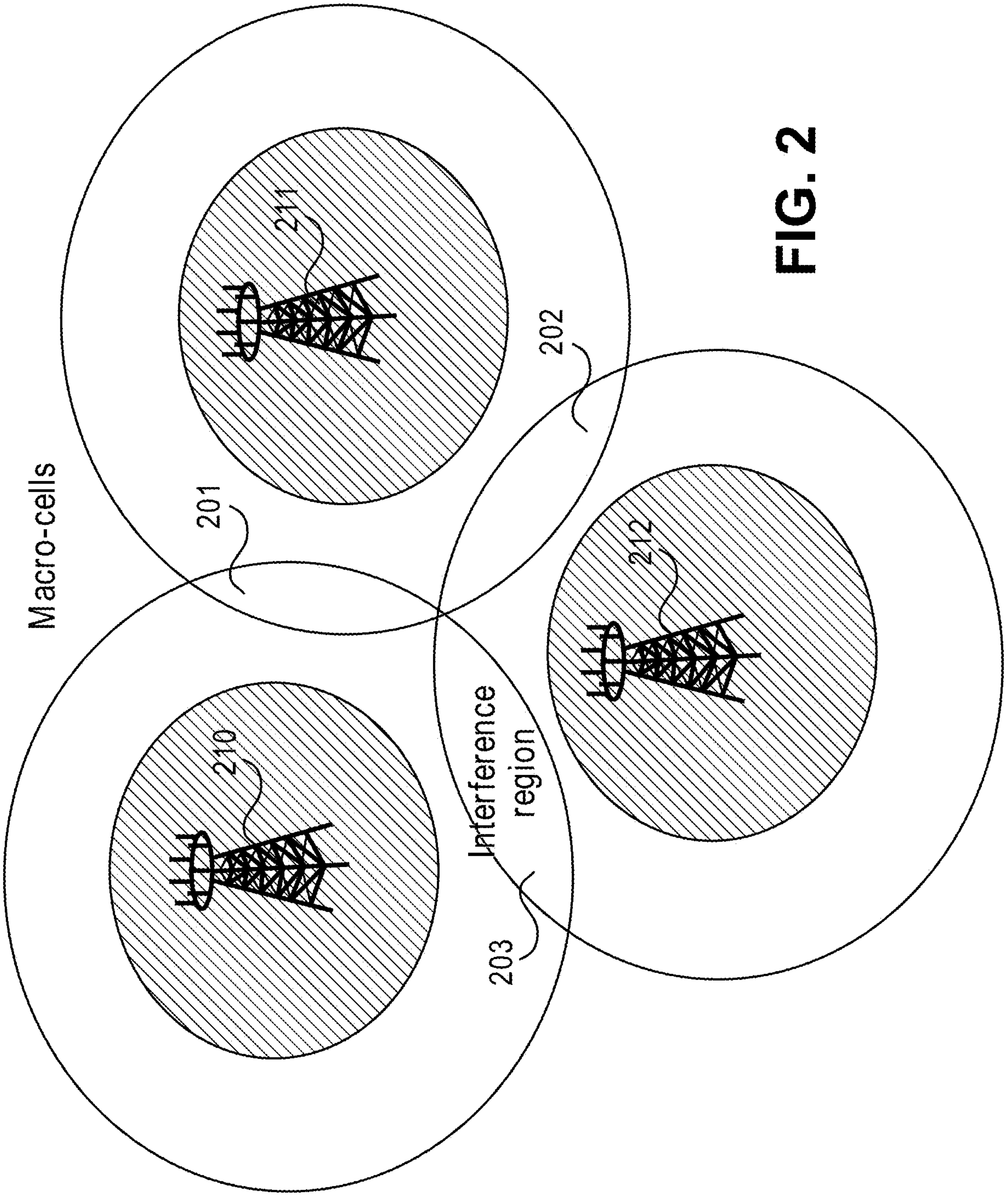
FIG. 2 illustrates inter-cell interference in a plurality of different regions.

While prior art inter-cell methods (e.g., network MIMO and CoMP systems [53-64]) can improve reliability of cellular networks by eliminating inter-cell interference, their capacity gains are only marginal. In fact, those systems constrain power transmitted from every BTS to be contained within the cell boundaries and are only effective to eliminate inter-cell interference due to power leakage across cells. FIG. 2 shows one example of cellular networks with three BTSs 210-212, each one characterized by its own coverage area or cell. The power transmitted from each BTS 210-212 is constrained to limit the amount of interference across cells, depicted in FIG. 2 by the areas where the cells overlap. As these systems operate in the low SINR regime at the interference region, their gains in spectral efficiency is only marginal, similarly to intra-cell schemes for SU-MIMO. To truly obtain significant capacity gains in inter-cell cooperative networks, power constraints limited to cell-boundaries must be relaxed and spatial multiplexing techniques should be enabled throughout the cells where the SINR is high (not just at the cell-edge with poor SINR performance as in prior art approaches).

Figure 3:
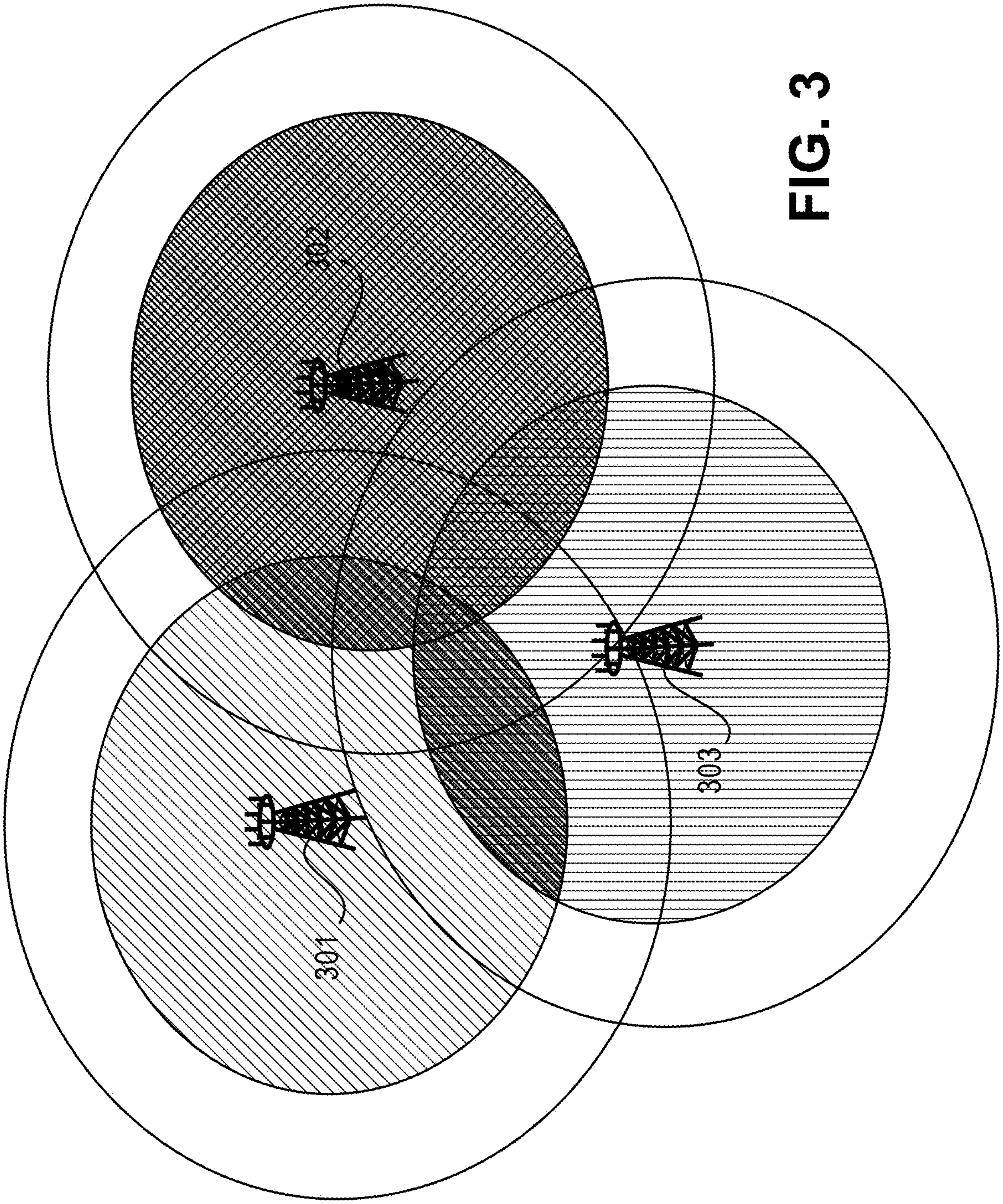
FIG. 3 illustrates an embodiment in which the power transmitted from three base transceiver stations (BTSs) all transmitting simultaneously at the same frequency is increased, thereby allowing a higher level of interference throughout the cell.

It would thus be desirable to provide a system that achieves orders of magnitudes increase in spectral efficiency by removing any constraint on the power transmitted from distributed BTSs and exploiting inter-cell multiplexing gain via spatial processing. FIG. 3 shows the case where the power transmitted from three BTSs 301-303 all transmitting simultaneously at the same frequency is increased, thereby allowing a higher level of interference throughout the cell. In prior art systems, such interference would result in incoherent interference (disrupting UE signal reception) throughout the interfering areas of the BTSs, but this interference is actually exploited in embodiments of the invention through novel inter-cell multiplexing methods using spatial processing to create areas of coherent interference (enhancing UE signal reception) around every UE, thereby providing simultaneous non-interfering data streams to every UE and increasing their SINR throughout the cell.

Figure 4:
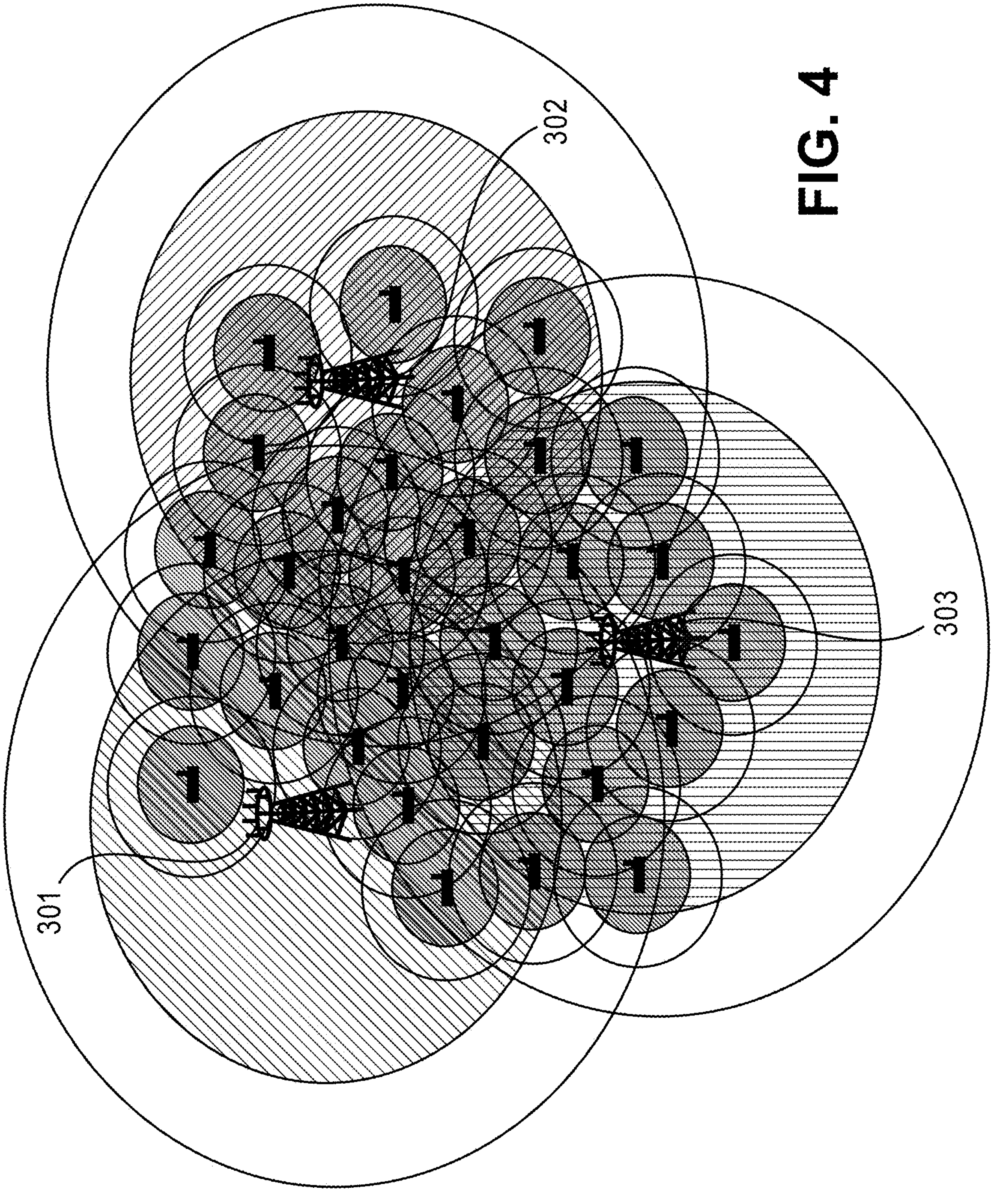
FIG. 4 illustrates one embodiment in which many additional access points are added to deliberately increase the level of incoherent interference throughout the cell.

In an exemplary embodiment of the invention, this inter-cell multiplexing gain is achieved through distributed-input distributed-output (DIDO) systems in Related Patents and Applications above and [77-78]. FIG. 4 shows one example where many additional access points 401 are added to deliberately increase the level of incoherent interference throughout the cell that is exploited in the present invention to generate areas of coherent interference around UEs and yield inter-cell multiplexing gain. Those additional BTSs can be low power transceivers, similar to inexpensive Wi-Fi access points, thereby providing smaller areas of coverage overlapping throughout the macrocell as shown in FIG. 4.

We observe that prior art inter-cell methods avoid incoherent interference by intentionally limiting the transmit power from every BTS 210-212 as in FIG. 2 and eliminate residual inter-cell interference (on the overlapping areas between cells) via spatial processing, thereby providing improved SINR and inter-cell diversity gain. By contrast, the present invention exploits incoherent interference to create coherent interference around the UEs, by transmitting higher power from every BTS, thereby improving signal quality at the UE that is necessary condition to obtain inter-cell multiplexing gain throughout the cell via spatial processing. As such, the systems described in prior art cannot be used to achieve inter-cell multiplexing gain via spatial processing, since there is not sufficient signal quality throughout the cell (due to the limited transmit power from the BTSs) to enable inter-cell multiplexing methods as in the present invention. Moreover, the systems described in prior art would be inoperable to achieve the multiplexing gain achieved in the present invention depicted in FIGS. 3-4, given that prior art systems were designed to avoid inter-cell interference within the diversity regions shown in the shaded area of FIG. 1-4 rather than exploit inter-cell interference in the multiplexing regions to obtain inter-cell multiplexing gain as achieved in the present invention.

The embodiments of the invention include a system and methods to exploit inter-cell multiplexing gain in wireless communications networks via spatial processing, employing a multiple antenna system (MAS) with multi-user (MU) transmissions (a Multi-User Multiple Antenna System, or "MU-MAS"). In one embodiment of the invention, the power transmitted from the multiple antennas is constrained to minimize interference at cell boundaries (as in conventional cellular systems) and spatial processing methods are employed only to eliminate inter-cell interference. In another embodiment of the invention, the power transmitted from the multiple antennas is not constrained to any particular power level (as long as their power emission level falls within the regulatory or safety limits), thereby creating intentionally higher levels of inter-cell interference throughout the cell that is exploited to achieve inter-cell multiplexing gain and increase the capacity of the wireless communications network.

In one embodiment, the wireless communications network is a cellular network as in FIGS. 1-2, such as a cellular network based on LTE standards. In another embodiment of the invention, the wireless communications network is not constrained to any particular cell layout and the cell boundaries can extend over larger areas as in FIGS. 3-4. For example, the wireless communications network could be a wireless local area network (WLAN), or a mesh, ad-hoc or sensor network, or a distributed antenna system, or a DIDO system with access points placed serendipitously without any transmit power constraint. But, such example network structures should not be considered as limiting the general applicability of the present invention to wireless communications networks. The present invention applies to any wireless network where multiplexing gain is achieved by transmitting signals from multiple antennas that interfere where received by multiple UEs so as to create simultaneous non-interfering data streams to multiple UEs.

Figure 9:
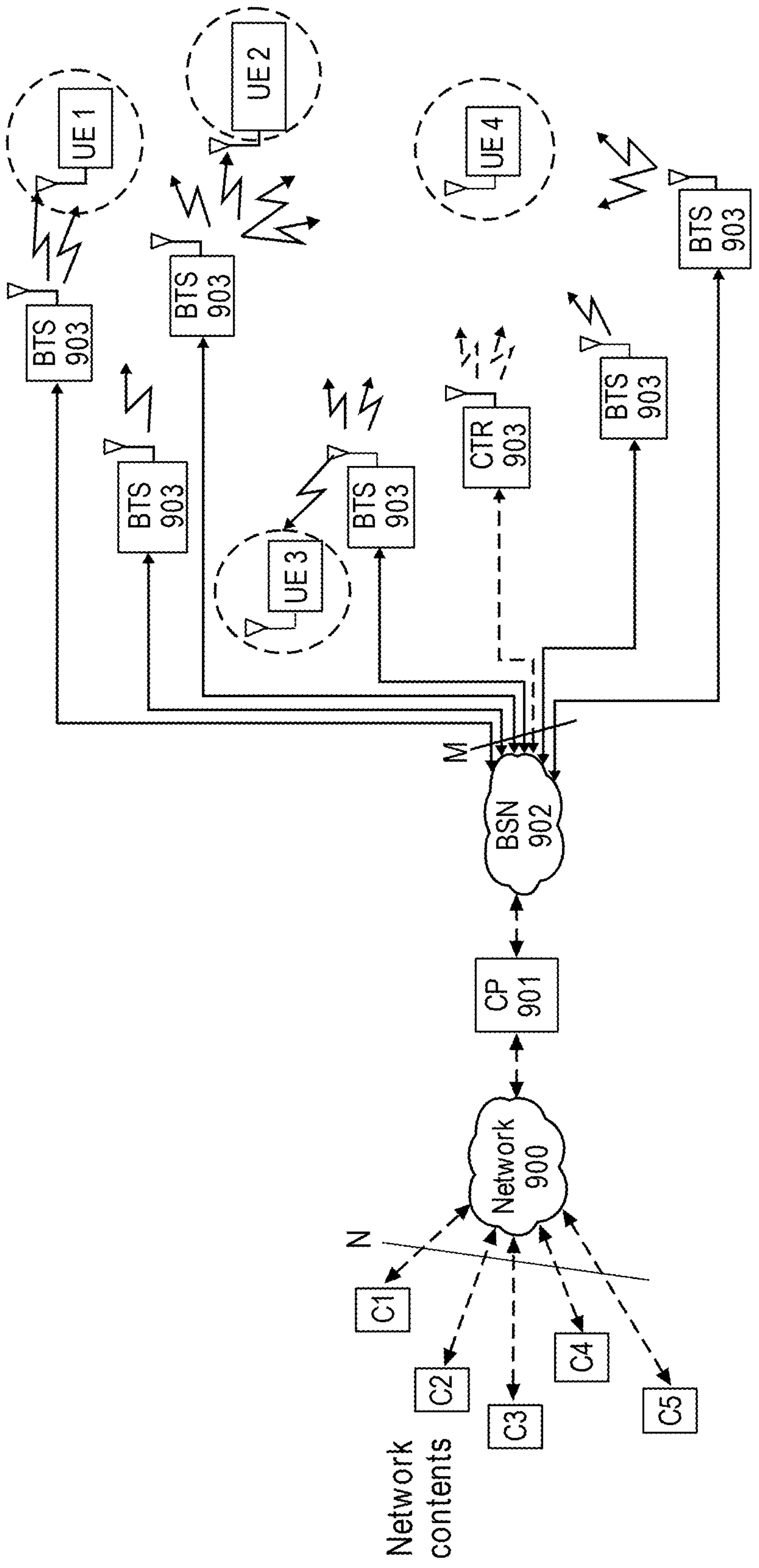
FIG. 9 illustrates a system architecture employed in one embodiment of the invention.

As illustrated in FIG. 9, one embodiment of the MU-MAS consists of a centralized processor 901, a base station network (BSN) 902 and M base transceiver stations (BTS) 903 communicating wirelessly to N client devices, also referred to as user equipment UEs (illustrated as UEs 1-4). The centralized processor unit 901 receives N streams of information over a network 900 (e.g., the Internet) with different network content C1-5 (e.g., videos, web-pages, video games, text, voice, etc., streamed from Web servers or other network sources) intended for different client devices UE 1-4. Hereafter, we use the term "stream of information" to refer to any stream of data sent over the network 900 containing information that can be demodulated or decoded as a standalone stream, according to certain modulation/coding scheme or protocol, to produce any data, including but not limited to audio, Web and video content. In one embodiment, the stream of information is a sequence of bits carrying network content that can be demodulated or decoded as a standalone stream.

The centralized processor 901 utilizes precoding transformation to combine (according to algorithms, such as those described in the Related Patents and Applications) the N streams of information from the network content into M streams of bits. By way of example, but not limitation, the precoding transformation can be linear (e.g., zero-forcing [65], block-diagonalization [66-67], matrix inversion, etc.) or non-linear (e.g., dirty-paper coding [68-70] or Tomlinson-Harashima precoding [71-72], lattice techniques or trellis precoding [73-74], vector perturbation techniques [75-76]). Hereafter, we use the term "stream of bits" to refer to any sequence of bits that does not necessarily contain any useful bit of information and as such cannot be demodulated or decoded as a standalone stream to retrieve the network content. In one embodiment of the invention, the stream of bits is the complex baseband signal produced by the centralized processor and quantized over given number of bits to be sent to one of the M transceiver stations.

In one embodiment, the MAS is a distributed-input distributed-output (DIDO) system as described in Related Patents and Patent Applications. In this embodiment, the DIDO system consists of:

User Equipment (UE) 1-4: An RF transceiver for fixed or mobile clients receiving data streams over the downlink (DL) channel from the DIDO backhaul and transmitting data to the DIDO backhaul via the uplink (UL) channel Base Transceiver Station (BTS) 903: The BTSs interface the DIDO backhaul with the wireless channel. BTSs of one embodiment are access points consisting of DAC/ADC and radio frequency (RF) chain to convert the baseband signal to RF. In some cases, the BTS is a simple RF transceiver equipped with power amplifier/antenna and the RF signal is carried to the BTS via RF-over-fiber technology as described in Related Patents and Applications.

Controller (CTR) 905: A CTR 905 is one particular type of BTS designed for certain specialized features such as transmitting training signals for time/frequency synchronization of the BTSs and/or the UEs, receiving/transmitting control information from/to the UEs, receiving the channel state information (CSI) or channel quality information from the UEs. One or multiple CTR stations can be included in any DIDO system. When multiple CTRs are available, the information to or from those stations can be combined to increase diversity and improve link quality. In one embodiment, the CSI is received from multiple CTRs via maximum ratio combining (MRC) techniques to improve CSI demodulation. In another embodiment, the control information is sent from multiple CTRs via maximum ratio transmission (MRT) to improve SNR at the receiver side. The scope of the invention is not limited to MRC or MRT, and any other diversity technique (such as antenna selection, etc.) can be employed to improve wireless links between CTRs and UEs.

Centralized Processor (CP) 901: The CP is a DIDO server interfacing the Internet or other types of external networks with the DIDO backhaul. In one embodiment, the CP computes the DIDO baseband processing and sends the waveforms to the distributed BTSs for DL transmission Base Station Network (BSN) 902: The BSN is the network connecting the CP to the distributed BTSs carrying information for either the DL or the UL channel. The BSN is a wireline or a wireless network or a combination of the two. For example, the BSN is a DSL, cable, optical fiber network, or Line-of-Sight (LOS) or Non-Line-of-Sight (NLOS) wireless link. Furthermore, the BSN is a proprietary network, or a local area network, or the Internet.

Hereafter we describe how the above DIDO system framework can be incorporated into the LTE standard for cellular systems (and also non-cellular system utilizing LTE protocols) to achieve additional gains in spectral efficiency. We begin with a general overview of LTE framework and modulation techniques employed in the DL and UL channels. Then we provide a brief description of the physical layer frame structure and resource allocation in the LTE standard. Finally, we define DIDO precoding methods for downlink (DL) and uplink (UL) channels in multi-user scenarios using the LTE framework. For the DL schemes, we propose two solutions: open-loop and closed-loop DIDO schemes.

Figure 5:
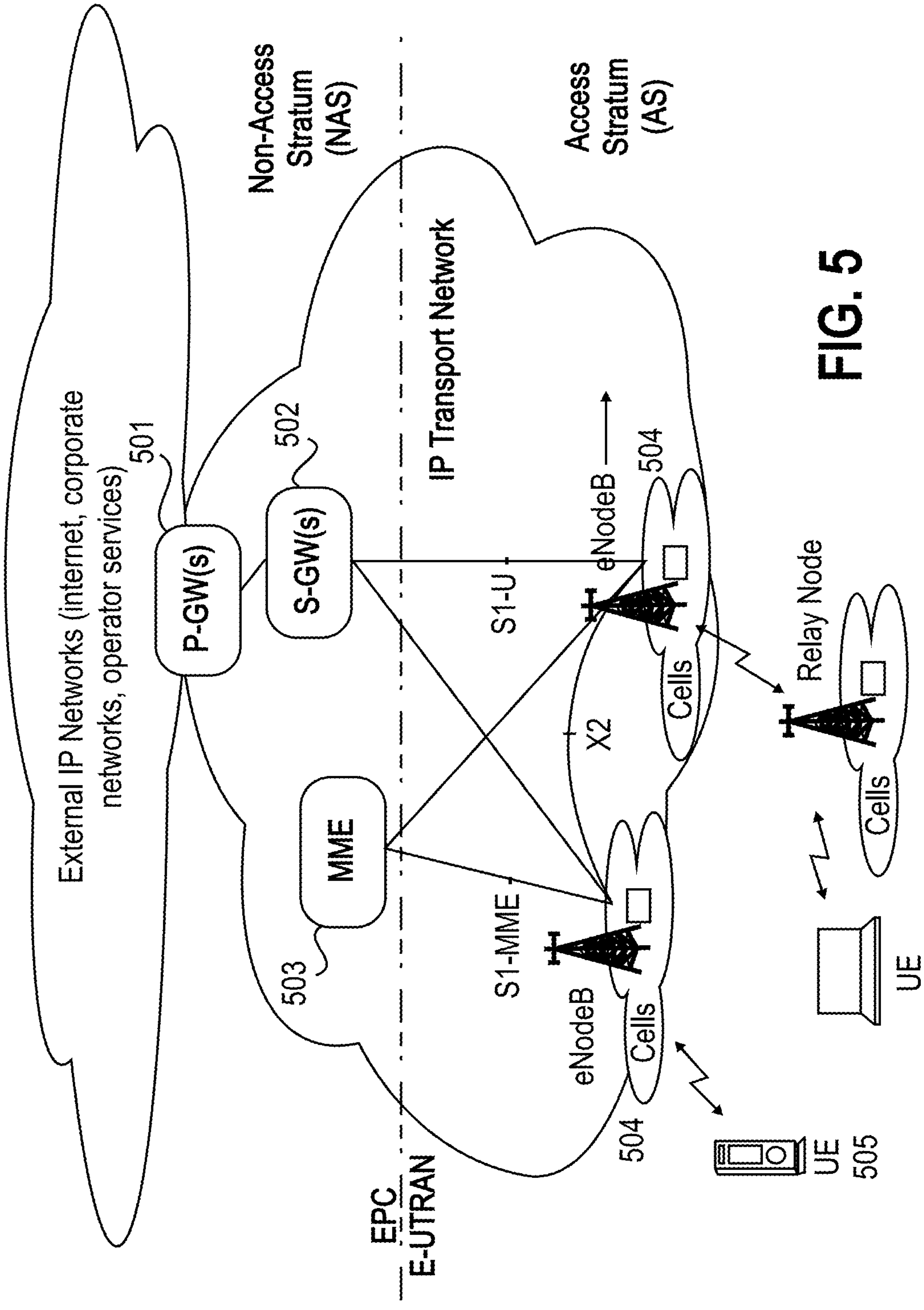
FIG. 5 illustrates a plurality of LTE network elements employed in one embodiment of the invention.

LTE is designed with a flat network architecture (as opposed a hierarchical architecture from previous cellular standards) to provide: reduced latency, reduced packet losses via ARQ, reduced call setup time, improved coverage and throughput via macro-diversity. The network elements in LTE networks depicted in FIG. 5 are [79]:

GW (gateway) 501-502: is the router connecting the LTE network to external networks (i.e., the Internet). The GW is split into serving gateway (S-GW) 502 that terminates the E-UTRAN interface and PDN gateway (P-GW) 501 being the interface with external networks. The S-GW 502 and P-GW 501 are part of the so called evolved packet core (EPC);

MME (mobility management entity) 503: manages mobility, security parameters and UE identity. The MME 503 is also part of the LTE EPC;

eNodeB (enhanced Node-B) 504: is the base station handling radio resource management, user mobility and scheduling; and UE (user equipment) 505: are the mobile stations.

In one embodiment of the invention, the LTE network is a DIDO network wherein the DIDO-UE is the UE in LTE networks, the DIDO-BTS is the LTE eNodeB, the DIDO-CTR is the LTE eNodeB or MME, the DIDO-CP is the LTE GW.

The LTE frame has duration of 10 msec and consists of ten subframes as depicted in FIGS. 6*a*-*c* [33,80]. Every subframe is divided in two slots of duration 0.5 msec each. The LTE standards defines two types of frames: i) type 1 for FDD operation as in FIG. 6*a*, where all subframes are assigned either for the downlink (DL) or uplink (UL) channels; ii) type 2 for TDD operation as in FIG. 6*b*, where part of the subframes are assigned to the DL and part to the UL (depending on the selected configuration), whereas a few subframes are reserved for "special use." There is at least one special subframe per frame and it consists of three fields: i) downlink pilot time slot (DwPTS) reserved for DL transmission; ii) guard period (GP); iii) uplink pilot time slot (UpPTS), for UL transmission.

Figure 7A:
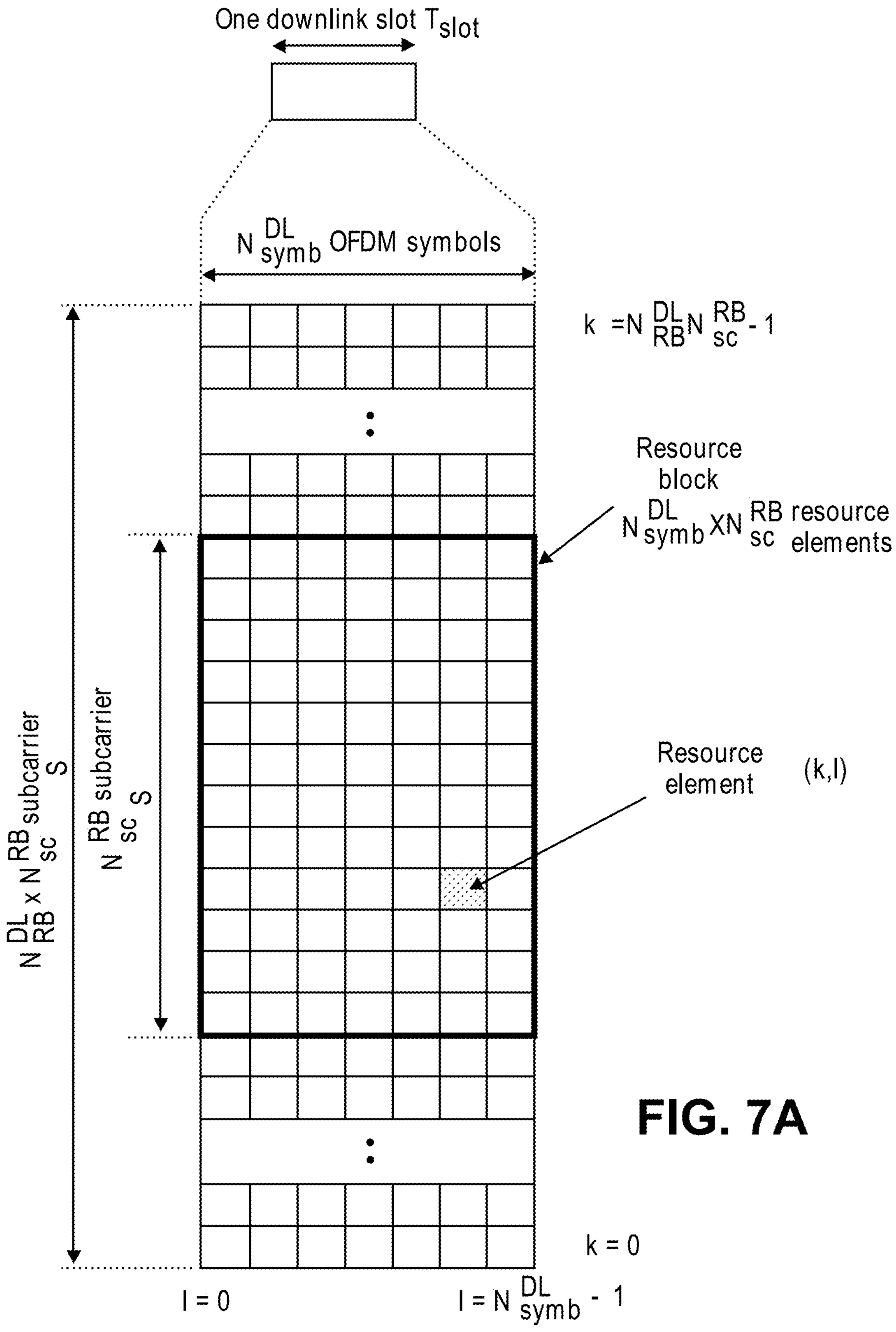
FIGS. 7*a-b* illustrate a "resource element" which is the smallest modulation structure in LTE and consists of one OFDM subcarrier in frequency and one OFDM symbol duration in time.
Figure 7B:
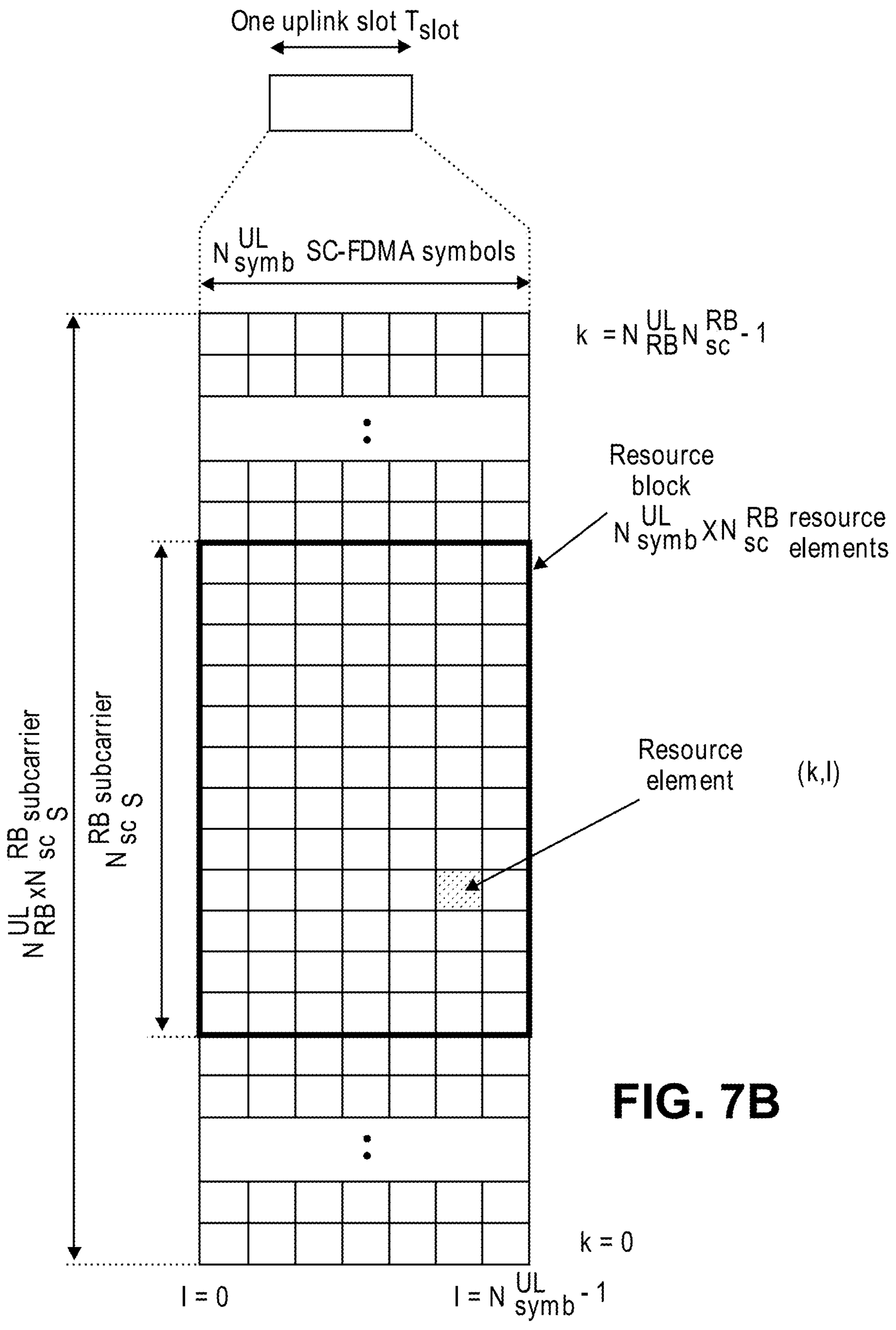

LTE employs orthogonal frequency division multiplexing (OFDM) and orthogonal frequency-division multiple access (OFMDA) modulation for the DL and Single-carrier FDMA (SC-FDMA) for the UL. The "resource element" (RE) is the smallest modulation structure in LTE and consists of one OFDM subcarrier in frequency and one OFDM symbol duration in time, as shown in FIGS. 7*a*-*b*. The "resource block" (RB) consists of 12 subcarriers in frequency and one 0.5 msec slot in time (consisting of 3 to 7 OFDM symbol periods, depending on DL versus UL channel and type of cyclic prefix).

1. Downlink Closed-Loop DIDO in LTE

DIDO closed-loop schemes can be used either in time-division duplex (TDD) or frequency division duplex (FDD) systems. In FDD systems, DL and UL channels operate at different frequencies and therefore the DL channel state information (CSI) must be estimated at the UE side and reported back to the CP through the BTSs or the CTRs via the UL channel. In TDD systems, DL and UL channels are set at the same frequency and the system may employ either closed-loop techniques or open-loop schemes exploiting channel reciprocity (as described in the following section). The main disadvantage of closed-loop schemes is they require feedback, resulting in larger overhead for control information over the UL.

One embodiment of a mechanism for closed-loop schemes in DIDO systems is as follows: i) the BTSs 903 send signaling information to the UEs over the DL; ii) the UEs exploit that signaling information to estimate the DL channel state information (CSI) from all the "active BTSs"; iii) the UEs quantize the DL CSI or use codebooks to select the precoding weights to be used for the next transmission; iv) the UEs send the quantized CSI or the codebook index to the BTSs 903 or CTRs 905 via the UL channel; v) the BTSs 903 or CTRs 905 report the CSI information or codebook index to the CP 901 that calculates the precoding weights for data transmission over the DL. The "active BTSs" are defined as the set of BTSs that are reached by given UE. For example, in related co-pending U.S. application Ser. No. 12/802,974, entitled "System And Method For Managing Inter-Cluster Handoff Of Clients Which Traverse Multiple DIDO Clusters" and related co-pending U.S. application Ser. No. 12/917,257, entitled "Systems And Methods To Coordinate Transmissions In Distributed Wireless Systems Via User Clustering" we defined the "user-cluster" as the set of BTSs that are reached by given UE. The number of active BTSs are limited to a user-cluster so as to reduce the amount of CSI to be estimated from the BTSs to given UE, thereby reducing the feedback overhead over the UL and the complexity of the DIDO precoding calculation at the CP 901.

1.1 Downlink DIDO Signaling within the LTE Standard

The LTE standard defines two types of reference signals (RS) that can be used for DL signaling in closed-loop schemes [33,50,82-83]: i) cell-specific reference signal (CRS); ii) UE specific RS such as channel state information (CSI) reference signal (CSI-RS) and demodulation RS (DM-RS). The cell-specific RS is not precoded, whereas the UE-specific RS is precoded [50]. CRS is used in LTE Release 8 that employs SU/MU-MIMO codebook-based techniques with up to four antennas in every cell. LTE-Advanced Release 10 supports non-codebook based SU/MU-MIMO schemes with up to eight transmit antennas as well as CoMP schemes with antennas distributed over different cells. As such, Release 10 allows for more flexible signaling schemes via CSI-RS. In the present invention, we describe how either types of signaling schemes can be used in DIDO systems to enable precoding.

1.1.1 DIDO Signaling using CRS

The CRS is employed in LTE (Release 8) systems to estimate the CSI from all transmit antennas at the BTS to the UE [80,84]. The CRS is obtained as the product of a two-dimensional orthogonal sequence and a two-dimensional pseudo-random numerical (PRN) sequence. There are three orthogonal and 170 possible PRN sequences, for a total of 510 different CRS sequences. Every sequence uniquely identifies one cell. CRS is transmitted within the first and third-last OFDM symbol of every slot, and every sixth subcarrier. Orthogonal patterns in time and frequency are designed for every transmit antenna of the BTS, for the UE to uniquely estimate the CSI from each of the four antennas. This high density of CRS in time and frequency (i.e., sent every slot of 0.5 msec, and every sixth subcarrier), producing 5% overhead, was designed intentionally to support scenarios with fast channel variations over time and frequency [83].

Figure 8:
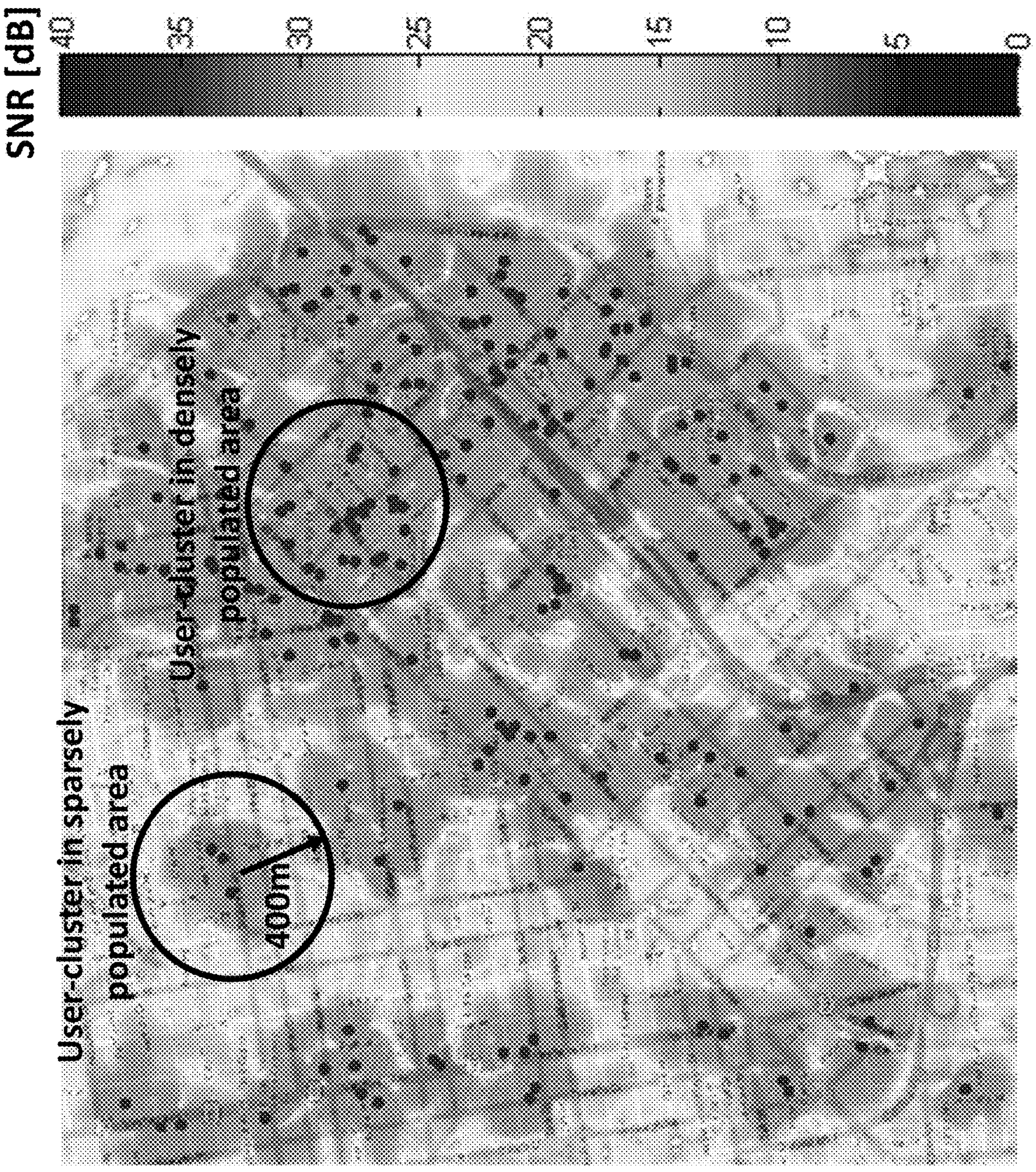
FIG. 8 illustrates a SNR distribution for practical deployment of one embodiment of the invention in downtown San Francisco, CA.

In practical DIDO systems, it may be the case that every UE sees more than only four BTSs within its user-cluster. For example, FIG. 8 shows the SNR distribution for practical deployment of DIDO systems in downtown San Francisco, CA. The propagation model is based on 3GPP pathloss/shadowing model [81] and assumes a carrier frequency of 900 MHz. The dots in the map indicate the location of the DIDO-BTSs, whereas the dark circle represents the user-cluster (with the UE being located at the center of the circle). In sparsely populated areas, the UE sees only a few BTSs within its user-cluster (e.g., as low as three BTSs for the example in FIG. 8), whereas in densely populated areas each user-cluster may comprise as many as 26 BTSs as in FIG. 8.

The high redundancy of the CRS can be exploited in DIDO systems to enable CSI estimation from any number of transmit antennas greater than four. For example, if the channel is fixed-wireless or characterized by low Doppler effects, there is no need to compute the CSI from all four transmit antennas every 0.5 msec (slot duration). Likewise, if the channel is frequency-flat, estimating the CSI every sixth subcarrier is redundant. In that case, the resource elements (RE) occupied by the redundant CRS can be re-allocated for other transmit antennas or BTSs in the DIDO system. In one embodiment of the invention, the system allocates resource elements of redundant CRS to extra antennas or BTSs in the DIDO system. In another embodiment, the system estimates time and frequency selectivity of the channel and dynamically allocates the CRS for different BTSs or only the BTSs within the user-cluster to different resource elements.

1.1.2 DIDO Signaling Using CSI-RS and DM-RS

In the LTE-Advanced (Release 10) standard the CSI-RS is used by every UE to estimate the CSI from the BTSs [33,83]. The standard defines orthogonal CSI-RS for different transmitters at the BTS, so that the UE can differentiate the CSI from different BTSs. Up to eight transmit antennas at the BTS are supported by the CSI-RS as in Tables 6.10.5.2-1,2 in [33]. The CSI-RS is sent with a periodicity that ranges between 5 and 80 subframes (i.e., CSI-RS send every 5 to 80 msec) as in Tables 6.10.5.3-1 in [33]. The periodicity of the CSI-RS in LTE-Advanced was designed intentionally larger than the CRS in LTE to avoid excessive overhead of control information, particularly for legacy LTE terminals unable to make use of these extra resources. Another reference signal used for CSI estimation is to demodulation RS (DM-RS). The DM-RS is a demodulation reference signal intended to a specific UE and transmitted only in the resource block assigned for transmission to that UE.

When more than eight antennas (maximum number of transmitters supported by the LTE-Advanced standard) are within the user-cluster, alternative techniques must be employed to enable DIDO precoding while maintaining system compliance to the LTE-Advanced standard. In one embodiment of the invention, every UE uses the CSI-RS or the DM-RS or combination of both to estimate the CSI from all active BTSs in its own user-cluster. In the same embodiment, the DIDO system detects the number of BTSs within the user-cluster and whether or not the user-cluster is compliant to the LTE-Advanced standard (supporting at most eight antennas). If it is not compliant, the DIDO system employs alternative techniques to enable DL signaling from the BTSs to the current UE. In one embodiment, the transmit power from the BTSs is reduced until at most eight BTSs are reachable by the UE within its user-cluster. This solution, however, may result in reduction of data rate as coverage would be reduced.

Another solution is to divide the BTSs in the user-cluster in subsets and send one set of CSI-RS for every subset at a time. For example, if the CSI-RS periodicity is 5 subframes (i.e., 5 msec) as in Table 6.10.5.3-1 in [33], every 5 msec the CSI-RS is sent from a new subset of BTSs. Note that this solution works as long as the CSI-RS periodicity is short enough to cover all BTS subsets within the channel coherence time of the UE (which is a function of the Doppler velocity of the UE). For example, if the selected CSI-RS periodicity is 5 msec and the channel coherence time is 100 msec, it is possible to define up to 20 BTS subsets of 8 BTS each, adding up to a total of 160 BTSs within the user-cluster. In another embodiment of the invention, the DIDO system estimates the channel coherence time of the UE and decides how many BTSs can be supported within the user-cluster for given CSI-RS periodicity, to avoid degradation due to channel variations and Doppler effect.

The solutions for CSI-RS proposed so far are all compliant with the LTE standard and can be deployed within the framework of conventional LTE systems. For example, the proposed method that allows more than eight antennas per user-cluster would not require modifications of the UE LTE hardware and software implementation, and only slight modification of the protocols used at the BTSs and CP to enable selection of BTSs subset at any given time. These modifications can be easily implemented in a cloud-based software defined radio (SDR) platform, which is one promising deployment paradigm for DIDO systems. Alternatively, if it is possible to relax the constraints of the LTE standard and develop slightly modified hardware and software for LTE UEs to support similar, but non-LTE-compliant DIDO modes of operation, so as enable UEs to be able to operate in full LTE-compliant mode, or in a modified mode that supports non-LTE-compliant DIDO operation. For example, another solution is to increase the amount of CSI-RS to enable higher number of BTSs in the system. In another embodiment of the invention, different CSI-RS patterns and periodicities are allowed as a means to increase the number of supported BTSs per user-cluster. Such slight modifications to the LTE standard may be small enough that existing LTE UE chipsets can be used with simply software modification. Or, if hardware modification would be needed to the chipsets, the changes would be small.

1.2 Uplink DIDO CSI Feedback Methods within the LTE Standard

In the LTE and LTE-Advanced standards, the UE feeds back information to the BTS to communicate its current channel conditions as well as the precoding weights for closed-loop transmission over the DL channel. Three different channel indicators are included in those standards [35]:

- Rank indicator (RI): indicates how many spatial streams are transmitted to given UE. This number is always equal or less than the number of transmit antennas.
- Precoding matrix indicator (PMI): is the index of the codebook used for precoding over the DL channel.
- Channel quality indicator (CQI): defines the modulation and forward error correction (FEC) coding scheme to be used over the DL to maintain predefined error rate performance for given channel conditions Only one RI is reported for the whole bandwidth, whereas the PMI and CQI reporting can be wideband or per sub-band, depending on the frequency-selectivity of the channel. These indicators are transmitted in the UL over two different types of physical channels: i) the physical uplink control channel (PUCCH), used only for control information; ii) the physical uplink shared channel (PUSCH), used for both data and control information, allocated over one resource block (RB) and on a sub-frame basis. On the PUCCH, the procedure to report the RI, PMI and CQI is periodic and the indicators can be either wideband (for frequency-flat channels) or UE-selected on a sub-band basis (for frequency-selective channels). On the PUSCH, the feedback procedure is aperiodic and can be UE-selected on a sub-band basis (for frequency-selective channels) or higher-layer configured sub-band (e.g., for transmission mode 9 in LTE-Advance with eight transmitters).

In one embodiment of the invention, the DIDO system employs RI, PMI and CQI to report to BTSs and CP its current channel conditions as well as precoding information. In one embodiment, the UE uses the PUCCH channel to report those indicators to the CP. In another embodiment, in case a larger number of indicators is necessary for DIDO precoding, the UE employs the PUSCH to report additional indicators to the CP. In case the channel is frequency-flat, the UE can exploit extra UL resources to report the PMI for a larger number of antennas in the DIDO systems. In one embodiment of the invention, the UE or BTSs or CP estimate the channel frequency selectivity and, in case the channel is frequency-flat, the UE exploits the extra UL resources to report the PMI for larger number of BTSs.

2. Downlink Open-loop DIDO in LTE

DIDO open-loop schemes can only be used in time-division duplex (TDD) systems exploiting channel reciprocity. One embodiment of a mechanism for open-loop schemes in DIDO systems is as follows: i) the UEs 1-4 send signaling information to the BTSs 903 or CTRs 905 over the UL; ii) the BTSs 903 or CTRs 905 exploit that signaling information to estimate the UL CSI from all UEs 1-4; iii) the BTSs 903 or CTRs 905 employ RF calibration to convert the UL CSI into DL CSI; iv) the BTSs 903 or CTRs 905 send the DL CSI or codebook index to the CP via the BSN 902; v) based on that DL CSI, the CP 901 calculates the precoding weights for data transmission over the DL. Similarly to closed-loop DIDO schemes, user-clusters can be employed to reduce the amount of CSI to be estimated at the BTSs from the UEs, thereby reducing the computational burden at the BTSs as well as the amount of signaling required over the UL. In one embodiment of the invention, open-loop precoding techniques are employed to send simultaneous non-interfering data streams from the BTSs to the UEs over the DL channel.

In LTE there are two types of reference signal for the uplink channel [31,33,87]: i) sounding reference signal (SRS), used for scheduling and link adaptation; ii) demodulation reference signal (DMRS), used for data reception. In one embodiment of the invention, the SRS or DMRS is employed in open-loop DIDO systems to estimate the UL channels form all UEs to all BTSs. In the time domain, the DMRS is sent at the fourth OFDM symbol (when a normal cyclic prefix is used) of every LTE slot (of duration 0.5 msec). In the frequency domain, the DMRS sent over the PUSCH is mapped for every UE to the same resource block (RB) used by that UE for UL data transmission.

The length of the DMRS is $M^{RS}=mN^{RB}$, where m is the number of RBs and $N^{RB}=12$ is the number of subcarriers per RB. To support multiple UEs, several DMRS are generated from one base Zadoff-Chu [88] or computer-generated constant amplitude zero autocorrelation (CG-CAZAC) sequence, via cyclic shift of the base sequence. Base sequences are divided into 30 groups and neighbor LTE cells select DMRS from different groups to reduce inter-cell interference. For example, if the maximum number of resource blocks within one OFDM symbol is 110 (i.e., assuming 20 MHz overall signal bandwidth), it is possible to generate up to 110×30=3300 different sequences.

In one embodiment of the invention, the DIDO system assigns the UEs to "virtual cells" to maximize the number of SRS or DMRS that can be used in the UL. In one exemplary embodiment, the virtual cell is the area of coherence (described in related co-pending U.S. application Ser. No. 13/232,996, entitled "Systems and Methods to Exploit Areas of Coherence in Wireless Systems") around the UE and the DIDO system generates up to 3300 areas of coherence for different UEs. In another embodiment of the invention, each of the 30 base sequences is assigned to a different DIDO cluster (clusters are defined in related U.S. Pat. No. 8,170, 081, issued May 1, 2012, entitled "System And Method For Adjusting DIDO Interference Cancellation Based On Signal Strength Measurements") to reduce inter-cluster interference across adjacent DIDO clusters. In another embodiment, the SRS or DMRS are assigned according to certain frequency hopping patterns to exploit channel frequency diversity.

In case there are not enough orthogonal SRSs or DMRSs for all UEs to be served simultaneously in the DL via DIDO precoding, one alternative is to multiplex the SRS or DMRS of different UEs in the time domain. For example, the UEs are divided into different groups and the SRSs or DMRSs for those groups are sent over consecutive time slots (of duration 0.5 msec each). In this case, however, it is necessary to guarantee that the periodicity of the SRS or DMRS assignment for different groups is lower than the channel coherence time of the fastest moving UE. In fact, this is necessary condition to guarantee that the channel does not vary for all UEs from the time the CSI is estimated via SRS or DMRS to the time system transmits DL data streams to the UEs via DIDO precoding. In one embodiment of the invention, the system divides the active UEs into groups and assigns the same set of SRS or DMRS to each group over consecutive time slots. In the same embodiment, the system estimates the shortest channel coherence time for all active UEs and calculates the maximum number of UE groups as well as the periodicity of the SRS or DMRS time multiplexing based on that information.

3. Uplink DIDO Techniques in LTE

Embodiments of the invention employ open-loop MU-MIMO schemes over the UL channel to receive simultaneous UL data streams from all UEs to the BTSs. One embodiment of the UL open-loop MU-MIMO scheme includes the following steps: i) UEs 1-4 send signaling information and data payload to all BTSs 903; ii) the BTSs 903 compute the channel estimations from all UEs using the signaling information; iii) the BTSs 903 send the channel estimates and data payloads to the CP 901; iv) the CP 901 uses the channel estimates to remove inter-channel interference from all UEs' data payloads via spatial filtering and demodulates the data streams form all UEs. In one embodiment, the open-loop MU-MIMO system employs single-carrier frequency division multiple access (SC-FDMA) to increase the number of UL channels from the UEs to the BTSs and multiplex them in the frequency domain.

In one embodiment, synchronization among UEs is achieved via signaling from the DL and all BTSs 903 are assumed locked to the same time/frequency reference clock, either via direct wiring to the same clock or sharing a common time/frequency reference, in one embodiment through GPSDO. Variations in channel delay spread at different UEs may generate jitter among the time references of different UEs that may affect the performance of MU-MIMO methods over the UL. In one embodiment, only the UEs within the same DIDO cluster (e.g., UEs in close proximity with one another) are processed with MU-MIMO methods to reduce the relative propagation delay spread across different UEs. In another embodiment, the relative propagation delays between UEs are compensated at the UEs or at the BTSs to guarantee simultaneous reception of data payloads from different UEs 1-4 at the BTSs 903.

The techniques for enabling signaling information for data demodulation over the UL may be the same methods used for signaling in the downlink open-loop DIDO scheme described at the previous section. The CP 901 may employ different spatial processing techniques to remove inter-channel interference from the UEs data payload. In one embodiment of the invention, the CP 901 employs non-linear spatial processing methods such as maximum likelihood (ML), decision feedback equalization (DFE) or successive interference cancellation (SIC) receivers. In another embodiment the CP 901 employs linear filters such as zeros-forcing (ZF) or minimum mean squared error (MMSE) receivers to cancel co-channel interference and demodulate the uplink data streams individually.

4. Integration with Existing LTE Networks

In the United States and other regions of the world, LTE networks are already in operation or are in the process of being deployed and/or committed to be deployed. It would be of significant benefit to LTE operators if they could gradually deploy DIDO capability into their existing or already-committed deployments. In this way, they could deploy DIDO in areas where it would provide the most immediate benefit, and gradually expand the DIDO capability to cover more their network. In time, once they have sufficient DIDO coverage in an area, they can choose to cease using cells entirely, and instead switch entirely to DIDO and achieve much higher spectral density at much lower cost. Throughout this entire transition from cellular to DIDO, the LTE operator's wireless customers will never see a loss in service. Rather, they will simply see their data throughput and reliability improve, while the operator will see its costs decline.

There are several embodiments that would enable a gradual integration of DIDO into existing LTE networks. In all cases, the BTSs for DIDO will be referred as DIDO-LTE BTSs and will utilize one of the LTE-compatible DIDO embodiments described above, or other LTE-compatible embodiments as they may be developed in the future. Or, the DIDO-LTE BTSs will utilize a slight variant of the LTE standard, such as those described above and the UEs will either be updated (e.g. if a software update is sufficient to modify the UE to be DIDO compatible), or a new generation of UEs that are DIDO-compatible will be deployed. In either case, the new BTSs that support DIDO either within the constraints of the LTE standard, or as a variant of the LTE standard will be referred to below as DIDO-LTE BTSs.

The LTE standard supports various channel bandwidths (e.g., 1.4, 3, 5, 10, 15 and 20 MHz). In one embodiment, an operator with an existing LTE network can either allocate new bandwidth for the LTE-DIDO BTSs, or would subdivide the existing LTE spectrum (e.g. 20 MHz could be subdivided into two 10 MHz blocks) to support conventional LTE BTSs in a cellular configuration in one block of spectrum and DIDO LTE BTSs in another block of spectrum. Effectively, this would establish two separate LTE networks, and UE devices would be configured to use one or the other network, or select between the two. In the case of subdivided spectrum, the spectrum may be divided evenly between the conventional LTE network and the DIDO-LTE network, or unevenly, allocated more spectrum to whichever network could best utilize it given the level of cellular LTE BTS and DIDO-LTE BTS deployment and/or UE usage patterns. This subdivision could change as needed over time, and at some point, when there are sufficient DIDO-LTE BTSs deployed to provide the same or better coverage as the cellular BTSs, all of the spectrum can be allocated to DIDO-LTE BTSs, and the cellular BTSs can be decommissioned.

In another embodiment, the conventional cellular LTE BTSs can be configured to be coordinated with the DIDO-LTE BTSs such that they share the same spectrum, but take turns using the spectrum. For example, if they were sharing the spectrum use equally, then each BTS network would utilize one 10 ms frame time in alternation, e.g. one 10 ms frame for the cellular LTE BTS, followed by one 10 ms frame for the DIDO-LTE BTS. The frame times could be subdivided in unequal intervals as well. This interval splitting could change as needed over time, and at some point, when there are sufficient DIDO-LTE BTSs deployed to provide the same or better coverage as the cellular BTSs, all of the time can be allocated to DIDO-LTE BTSs, and the cellular BTSs can be decommissioned.

In another embodiment of the invention, DIDO is employed as LOS or NLOS wireless backhaul to small cells in LTE and LTE-Advanced networks. As small-cells are deployed in LTE networks, DIDO provides high-speed wireless backhaul to those small cells. As the demand for higher data rate increases, more small-cells are added to the network until the wireless network reaches a limit where no more small-cells can be added in a given area without causing inter-cell interference. In the same embodiment of the invention, DIDO BTSs are used to replace gradually small-cells, thereby exploiting inter-cell interference to provide increased network capacity.

REFERENCES

[1] A. Paulraj, R. Nabar, and D. Gore, Introduction to Space-Time Wireless Communications, Cambridge University Press, 40 West 20th Street, New York, NY, USA, 2003

[2] D. Gesbert, M. Shafi, D. Shiu, P.J. Smith and A. Naguib, “From theory to practice: an overview of MIMO space-time coded wireless systems”, *IEEE Journal on Selected Areas on Communications*, vol. 2, n. 3, pp. 281-302, April 2003

[3] L. Zheng and D. N. C. Tse, “Diversity and multiplexing: a fundamental tradeoff in multiple-antenna channels,” *IEEE Trans. Info. Th.*, vol. 49, no. 5, pp. 1073-1096, May 2003

[4] D. N. C. Tse, P. Viswanath, and L. Zheng, “Diversity-multiplexing tradeoff in multiple-access channels”, *IEEE Trans. Info. Th.*, vol. 50, no. 9, pp. 1859-1874, September 2004

[5] E. Visotsky and U. Madhow, “Space-time transmit precoding with im-perfect feedback,” IEEE Trans. Info. Th., vol. 47, pp. 2632-2639, September 2001.

[6] S. A. Jafar, S. Vishwanath, and A. Goldsmith, “Channel capacity and beamforming for multiple transmit and receive antennas with covariance feedback,” Proc. IEEE Int. Conf. on Comm., vol. 7, pp. 2266-2270, June 2001.

[7] S. A. Jafar and A. Goldsmith, “Transmitter optimization and optimality of beamforming for multiple antenna systems,” IEEE Trans. Wireless Comm., vol. 3, pp. 1165-1175, July 2004.

[8] E. A. Jorswieck and H. Boche, “Channel capacity and capacity-range of beamforming in MIMO wireless systems under correlated fading with covariance feedback,” IEEE Trans. Wireless Comm., vol. 3, pp. 1543-1553, September 2004.

[9] A. L. Moustakas and S. H. Simon, “Optimizing multiple-input single-output (MISO) communication systems with general Gaussian channels: nontrivial covariance and nonzero mean,” IEEE Trans. Info. Th., vol. 49, pp. 2770-2780, October 2003.

[10] M. Kang and M. S. Alouini, “Water-filling capacity and beamforming performance of MIMO systems with covariance feedback,” IEEE Work. on Sign. Proc. Adv. in Wire. Comm., pp. 556-560, June 2003.

[11] S. H. Simon and A. L. Moustakas, “Optimizing MIMO antenna systems with channel covariance feedback,” IEEE Jour. Select. Areas in Comm., vol. 21, pp. 406-417, April 2003.

[12] S. M. Alamouti, “A simple transmit diversity technique for wireless communications,” IEEE Jour. Select. Areas in Comm., vol. 16, no. 8, pp. 1451-1458, October 1998.

[13] V. Tarokh, N. Seshadri, and A. R. Calderbank, “Space-time codes for high data rate wireless communication: Performance criterion and code construction,” IEEE Trans. Info. Th., vol. 44, pp. 744-65, March 1998.

[14] V. Tarokh, H. Jafarkhani, and A. R. Calderbank, “Space-time block codes from orthogonal designs,” IEEE Trans. Info. Th., vol. 45, pp. 1456-467, July 1999.

[15] E. N. Onggosanusi, A. G. Dabak, and T. A. Schmidl, “High rate space-time block coded scheme: performance and improvement in correlated fading channels,” Proc. IEEE Wireless Comm. and Net. Conf., vol. 1, pp. 194-199, March 2002.

[16] G. D. Durgin, Space-Time Wireless Channels, Prentice Hall, Upper Saddle River, NJ, USA, 2003

[17] D.-S. Shiu, G. J. Foschini, M. J. Gans, and J. M. Kahn, “Fading corre-lation and its effect on the capacity of multielement antenna systems,” IEEE Trans. Comm., vol. 48, no. 3, pp. 502-513, March 2000

[18] A. Forenza and R. W. Heath Jr., “Impact of antenna geometry on MIMO communication in indoor clustered channels,” Proc. IEEE Antennas and Prop. Symp., vol. 2, pp. 1700-1703, June 2004.

[19] E. A. Jorswieck and H. Boche, “Channel capacity and capacity-range of beamforming in MIMO wireless systems under correlated fading with covariance feedback,” IEEE Trans. Wireless Comm., vol. 3, pp. 1543-1553, September 2004

[20] R. W. Heath Jr. and A. Paulraj, “Switching between multiplexing and diversity based on constellation distance,” Proc. of Allerton Conf. on 208, Comm. Control and Comp., September 2000.

[21] S. Catreux, V. Erceg, D. Gesbert, and R. W. Heath Jr., “Adaptive modulation and MIMO coding for broadband wireless data networks,” IEEE Comm. Mag., vol. 2, pp. 108-115, June 2002.

[22] A. Forenza, A. Pandharipande, H. Kim, and R. W. Heath Jr., “Adaptive MIMO transmission scheme: Exploiting the spatial selectivity of wireless channels,” Proc. IEEE Veh. Technol. Conf., vol. 5, pp. 3188-3192, May 2005

[23] C. B. Chae, A. Forenza, R. W. Heath, Jr., M. R. Mckay, and I. B. Collings, “Adaptive MIMO Transmission Techniques for Broadband Wireless Communication Systems,” *IEEE Communications Magazine*, vol. 48, no. 5, pp. 112-118, May 2010

[24] FCC, “Broadband action agenda”, National Broadband Plan, 2010 http://www.broadband.gov/plan/national-broadband-plan-action-agenda.pdf

[25], N. Delfas, F. Meunier, S. Flannery, T. Tsusaka, E. Gelblum and S. Kovler, “Mobile data wave: who dares to invest, wins”, Morgan Stanley Research Global, June 13, 2012

[26] D. Goldman, "Sorry, America: your wireless airwaves are full", CNN Money http://money.cnn.com/2012/02/21/technology/spectrum_crunch/index.htm
[27] P. Rysavy, "No silver bullets for FCC, NTIA spectrum challange", Daily report for executives, Bloomberg BNA, August 2012 http://www.rysavy.com/Articles/2012_09_No_Spectrum_Silver_Bullets.pdf
[28] T. W. Hazlett, "Radio spectrum for a hungry wireless world", Sept. 22, 2011
[29] B. J. Love, D. J. Love and J. V. Krogmeier, "Like deck chairs on the Titanic: why spectrum reallocation won't avert the coming data crunch but technology might keep the wireless industry afloat", February 2012
[30] Qualcomm, "The 1000× data challenge, the latest on wireless, voice, services and chipset evolution", 4G World, Oct. 31$^{st}$, 2012
[31] J. Lee, J.-K. Han, J. Zhang, "MIMO technologies in 3GPP LTE and LTE-advanced", EURASIP Journal on Wireless Communications and Networking, Hindawi, May 2009
[32] 3GPP, TS 36.201, "Evolved Universal Terrestrial Radio Access (E-UTRA); LTE Physical Layer-General Description (Release 8)"
[33] 3GPP, TS 36.211, "Evolved Universal Terrestrial Radio Access (E-UTRA); Physical Channels and Modulation (Release 8)"
[34] 3GPP, TS 36.212, "Evolved Universal Terrestrial Radio Access (E-UTRA); Multiplexing and channel coding (Release 8)"
[35] 3GPP, TS 36.213, "Evolved Universal Terrestrial Radio Access (E-UTRA); Physical layer procedures (Release 8)"
[36] T. Yoo, N. Jindal, and A. Goldsmith, "Multi-antenna broadcast channels with limited feedback and user selection," IEEE Journal on Sel. Areas in Communications, vol. 25, pp. 1478-91, July 2007.
[37] P. Ding, D. J. Love, and M. D. Zoltowski, "On the sum rate of channel subspace feedback for multi-antenna broadcast channels," in Proc., IEEE Globecom, vol. 5, pp. 2699-2703, November 2005.
[38] N. Jindal, "MIMO broadcast channels with finite-rate feedback," IEEE Trans. on Info. Theory, vol. 52, pp. 5045-60, November 2006.
[39] D. J. Love, R. W. Heath, Jr., V. K. N. Lau, D. Gesbert, B. D. Rao, and M. Andrews, "An Overview of Limited Feedback in Wireless Communication Systems," *IEEE Journal on Sel. Areas in Comm.*, Special Issue on Exploiting Limited Feedback in Tomorrow's Wireless Communication Networks, vol. 26, no. 8, pp. 1341-1365, October 2008.
R. W. Heath, Jr., D. J. Love, V. K. N. Lau, D. Gesbert, B. D. Rao, and M. Andrews, "Exploiting Limited Feedback in Tomorrow's Wireless Communication Networks," *IEEE Journal on Sel. Areas in Comm.*, Special Issue on Exploiting Limited Feedback in Tomorrow's Wireless Communication Networks, vol. 26, no. 8, pp. 1337-1340, October 2008.
[41] D. J. Love, R. W. Heath, Jr., and T. Strohmer, "Grassmannian Beamforming for Multiple-Input Multiple-Output Wireless Systems," *IEEE Trans. on Info. Theory* special issue on MIMO Communication, vol. 49, pp. 2735-2747, October 2003
[42] C. B. Chae, D. Mazzarese, N. Jindal and R. W. Heath, Jr., "Coordinated Beamforming with Limited Feedback in the MIMO Broadcast Channel" *IEEE Journal on Sel. Areas in Comm.*, Special Issue on Exploiting Limited Feedback in Tomorrow's Wireless Communication Networks, vol. 26, no. 8, pp. 1505-1515, October 2008
[43] A. Paulraj, "Is OFDMA, MIMO and OS the right stuff for mobile broad-band?" http://www.ieeevtc.org/vtc2005fall/presentations/paulraj.pdf, September 2005
[44] J. Wannstrom, "Carrier aggregation explained", 3GPP http://www.3gpp.org/Carrier-Aggregation-explained
[45] 3GPP, TS 36.808, "Evolved Universal Terrestrial Radio Access (E-UTRA); Carrier Aggregation (Release 10)", v 10.0.0, June 2012
[46] Nokia Siemens Networks, "2020: beyond 4G, radio evolution for the gigabit experience", White Paper, 2011, www.nokiasiemensnetworks.com
[47] S. Marek, "AT&T's Rinne talks about carrier aggregation trials, small cells and more", http://www.fiercebroadbandwireless.com/story/atts-rinne-talks-about-carrier-aggregation-trials-small-cells-and-more/2012-11-08
[48] M. Reed, "InterfereX", Tech23, 2011 http://www.youtube.com/watch?v=YPpELm6iip8
[49] NICTA, "InterfereX", http://www.nicta.com.au/research/archive/research_themes/networked_systems/interferex
[50] J. Duplicity, et al., "MU-MIMO in LTE systems", EURASIP Journal on Wireless Communications and Netowrking, March 2011
[51] S. Feng and E. Seidel, "Self-organizing networks (SON) in 3GPP LTE", Nomor research, May 2008
[52] NEC, "Self organizing networks", White paper, February 2009
[53] U.S. Pat. No. 5,809,422, issued Sep. 15, 1998, entitled "Distributed microcellular communications system", G. R. Raleigh, M. A. Pollack
[54] G. J. Foschini, H.C. Huang, K. Karakayali, R. A. Valenzuela, and S. Venkatesan. The Value of Coherent Base Station Coordination. In *Conference on Information Sciences and Systems* (*CISS* 2005), March 2005
[55] M. K. Karakayali, G. J. Foschini, R. A. Valenzuela, and R. D. Yates, "On the maximum common rate achievable in a coordinated network," *Proc. of the Int'l Conf. on Communications* (*ICC'*06), vol. 9, pp. 4333-4338, June 2006.
[56] M. K. Karakayali, G. J. Foschini, and R. A. Valenzuela, "Network coordination for spectrally efficient communications in cellular systems," *IEEE Wireless Communications Magazine, vol.* 13, no. 4, pp. 56-61, August 2006.
[57] G. J. Foschini, M. K. Karakayali, and R. A. Valenzuela, "Coordinating multiple antenna cellular networks to achieve enormous spectral efficiency," *Pro-ceedings of the IEEE*, vol. 153, no. 4, pp. 548-555, August 2006.
[58] S. Venkatesan, A. Lozano, and R. Valenzuela, "Network MIMO: overcoming inter-cell interference in indoor wireless systems", Proc. of Asilomar conf., pp.83-87, November 2007
[59] S. Venkatesan, H. Huang, A. Lozano, and R. Valenzuela, "A WiMAX-based implementation of network MIMO for indoor wireless systems", EURASIP Journal on Advances in Signal Processing, September 2009
[60] Y. Liang, R. Valenzuela, G. Foschini, D. Chizhik, and A. Goldsmith, "Interference suppression in wireless cellular networks through picocells", ACSSC, pp.1041-1045, November 2007
[61] A. Papadogiannis, H. J. Bang, D. Gesbert, and E. Hardouin, "Efficient selective feedback design for multicell cooperative networks", IEEE Trans. On Vehicular Techn., pp. 196-205, vol. 60, n. 1, January 2011

[62] I. F. Akyildiz, D. M. Guterrez-Estevez, E. C. Reyes, "The evolution to 4G cellular systems: LTE-Advanced", Physical communication, Elsevier, pp.217-244, 2010

[63] A. Barbieri, P. Gaal, S. Geirhofer, T. Ji, D. Malladi, Y. Wei, and F. Xue, "Coordinated downlink multi-point communications in heterogeneous cellular networks", (Qualcomm), Information Theory and App. Workshop, pp. 7-16, February 2012

[64] S. Parkvall, E. Dahlman, A. Furuskar, Y. Jading, M. Olsson, S. Wanstedt, and K. Zangi, "LTE-Advanced—evolving LTE towards IMT-Advanced", (Ericsson) IEEE VTC, pp. 1-5, September 2008

[65] R. A. Monziano and T. W. Miller, *Introduction to Adaptive Arrays*, New York: Wiley, 1980.

[66] K. K. Wong, R. D. Murch, and K. B. Letaief, "A joint channel diagonalization for multiuser MIMO antenna systems," IEEE Trans. Wireless Comm., vol. 2, pp. 773-786, July 2003;

[67] R. Chen, R. W. Heath, Jr., and J. G. Andrews, "Transmit Selection Diversity for Unitary Precoded Multiuser Spatial Multiplexing Systems with Linear Receivers," *IEEE Trans. on Signal Proc.*, vol. 55, no. 3, pp. 1159-1171, March 2007.

[68] M. Costa, "Writing on dirty paper," *IEEE Transactions on Information Theory*, Vol. 29, No. 3, Page(s): 439-441, May 1983.

[69] G. Caire and S. Shamai, "On the achievable throughput of a multiantenna Gaussian broadcast channel," IEEE Trans. Info. Th., vol. 49, pp. 1691-1706, July 2003.

[70] Nihar Jindal & Andrea Goldsmith, "Dirty Paper Coding vs. TDMA for MIMO Broadcast Channels", IEEE Trans. on Info. Theory, vol. 51, pp. 1783-1794, May 2005

[71] M. Tomlinson, "New automatic equalizer employing modulo arithmetic," *Electronics Letters*, Page(s): 138-139, March 1971.

[72] H. Miyakawa and H. Harashima, "A method of code conversion for digital communication channels with intersymbol interference," *Trans. of the Inst. of Electronic*

[73] U. Erez, S. Shamai (Shitz), and R. Zamir, "Capacity and lattice-strategies for cancelling known interference," *Proceedings of International Symposium on Information Theory*, Honolulu, Hawaii, November 2000.

[74] W. Yu and J. M. Cioffi, "Trellis Precoding for the Broadcast Channel", IEEE Globecom, vol. 2, pp. 1344-1348, 2001

[75] B. M. Hochwald, C. B. Peel, and A. L. Swindlehurst, "A Vector-Perturbation Technique for Near-Capacity Multiantenna Multiuser Communication—Part I: Channel Inversion and Regularization", IEEE Trans. On Communications, vol. 53, n.1, pp. 195-202, January 2005

[76] B. M. Hochwald, C. B. Peel, and A. L. Swindlehurst, "A Vector-Perturbation Technique for Near-Capacity Multiantenna Multiuser Communication—Part II: Perturbation", IEEE Trans. On Communications, vol. 53, n. 3, pp. 537-544, March 2005

[77] S. Perlman and A. Forenza, "Distributed-input distributed-output (DIDO) wireless technology: a new approach to multiuser wireless", Rearden Labs White Paper, July 2011, http://www.reardenwireless.com/110727-DIDO-A%20New%20Approach%20to%20Multiuser%20 Wireless.pdf

[78] A. Vance, "Steve Perlman's wireless fix", Businessweek, July 2011 http://www.businessweek.com/magazine/the-edison-of-silicon-valley-07272011.html

[79] M. Lindström (Ericsson), "LTE-Advanced Radio Layer 2 and RRC aspects", 3GPP TSG-RAN WG2

[80] Anritsu, "LTE resource guide", www.us.anritsu.com

[81] 3GPP, "Spatial Channel Model AHG (Combined adhoc from 3GPP & 3GPP2)", SCM Text V6.0, Apr. 22, 2003

[82] J. Lee, "Introduction of LTE-Advanced DL/UL MIMO", Samsung Electronics, September 2009

[83] E. Dahlman, S. Parkvall and J. Skold, "4G: LTE/LTE-Advanced for mobile broadband", Elsevier, 2011

[84] J. Syren, "Overview on the 3GPP long term evolution physical layer", Freescale White Paper, July 2007

[85] M. Baker, "LTE-Advanced physical layer", Alcatel-Lucent, December 2009

[86] J. Xu, "LTE-Advanced signal generation and measurements using SystemVue", Agilent Technologies

[87] X. Hou and H. Kayama, "Demodulation reference signal design and channel estimation for LTE-Advanced uplink", DOCOMO, Adv. in Vehic. Netw. Tech., April 2011

[88] D. C. Chu, "Polyphase codes with good periodic correlation properties", *IEEE Trans. Info. Theory*, vol. 18, n. 4, pp. 531-532, July 1972

We claim:

1. A wireless system comprising:

a plurality of wireless user equipment devices ("UEs"); and a base transceiver station ("BTS") comprising more than eight antennas, the BTS configured to be communicatively coupled to the plurality of UEs and configured to simultaneously transmit on the more than eight antennas overlapping wireless waveforms and, at a same time or different time, simultaneously transmit or receive at least one or more of a 3GPP cell-specific reference signal ("CRS"), a cell-specific channel state information reference signal ("CSI-RS"), a sounding reference signal ("SRS"), or a demodulation reference signal ("DMRS");

wherein the BTS is configured to utilize precoding to combine N streams of information from M streams of bits to create a plurality of concurrent non-interfering downlink ("DL") data links;

wherein the BTS is configured to maintain a plurality of concurrent non-interfering DL links between the more than eight antennas and the plurality of UEs within a same frequency band when transmitting and configured to maintain a plurality of uplink ("UL") links between the more than eight antennas and the plurality of UEs within a same frequency band when receiving;

wherein each of the plurality of UEs is configured to receive a DL data link from the BTS and transmit a UL data link to the BTS, and is configured to transmit or receive one or more of the 3GPP CRS, CSI-RS, SRS, or DMRS signals; and wherein M and N are integer numbers less than or equal to the number of the more than eight antennas.

2. The system as in claim 1 wherein the BTS is part of a mobile network.

3. The system as in claim 1, wherein the BTS is compatible with 3GPP protocols.

4. The system as in claim 1, wherein the BTS uses closed-loop or open-loop precoding methods.

5. The system as in claim 1, wherein a DL or UL reference signal is used to estimate a channel state information ("CSI") of each of the plurality of UEs.

6. The system as in claim 1, wherein UL/DL reciprocity is exploited to estimate a channel state information ("CSI") of each of the plurality of UEs.

7. A method implemented within a wireless system including a plurality of user equipment devices (UEs) and a base transceiver station ("BTS") comprising:

simultaneously transmitting, by the BTS, overlapping wireless waveforms from more than eight antennas, and at a same or different time, simultaneously transmitting or receiving one or more of a 3GPP cell-specific reference signal ("CRS"), cell-specific channel state information reference signal ("CSI-RS"), a sounding reference signal ("SRS"), or a demodulation reference signal ("DMRS");

precoding, by the BTS, to combine N streams of information from M streams of bits to create:

a. a plurality of concurrent non-interfering downlink ("DL") data links; and b. a plurality of concurrent non-interfering uplink ("UL") data links;

simultaneously receiving, by each of the plurality of UEs, DL data link from the BTS, and at a same or different time each of the plurality of UEs transmits or receives one or more of the 3GPP CRS, CSI-RS, SRS, or DMRS signals, maintaining, by the BTS, a plurality of concurrent non-interfering DL links between the more than eight antennas and the plurality of UEs within a same frequency band when transmitting and maintaining a plurality of concurrent non-interfering UL links between the more than eight antennas and the plurality of UEs within a same frequency band when receiving; and wherein M and N are integer numbers less than or equal to the number of the more than eight antennas.

8. The method as in claim 7, wherein the BTS is part of a mobile network.

9. The method as in claim 7, wherein the BTS is compatible with 3GPP protocols.

10. The method as in claim 7, wherein the BTS uses closed-loop or open-loop precoding.

11. The method as in claim 7, wherein the BTS uses a DL or UL reference signal to estimate a channel state information ("CSI") of each of the plurality of UEs.

12. The method as in claim 7, wherein the BTS exploits UL/DL reciprocity to estimate a channel state information ("CSI") of each of the plurality of UEs.

* * * * *